(12) United States Patent
Rouby et al.

(10) Patent No.: US 11,440,235 B2
(45) Date of Patent: Sep. 13, 2022

(54) EXTRUSION HEAD WITH CHANNELS FOR PRODUCING INSERTS IN A PROFILED BAND FOR MANUFACTURING A PNEUMATIC TIRE AND CORRESPONDING EXTRUSION METHOD

(71) Applicant: Compagnie Generale Des Etablissements Michelin, Clermont-Ferrand (FR)

(72) Inventors: Mickael Rouby, Clermont-Ferrand (FR); Christophe Bessac, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 260 days.

(21) Appl. No.: 16/623,113

(22) PCT Filed: Jun. 28, 2018

(86) PCT No.: PCT/FR2018/051599
§ 371 (c)(1),
(2) Date: Dec. 16, 2019

(87) PCT Pub. No.: WO2019/002782
PCT Pub. Date: Jan. 3, 2019

(65) Prior Publication Data
US 2020/0114565 A1    Apr. 16, 2020

(30) Foreign Application Priority Data

Jun. 30, 2017  (FR) ...................................... 17/56132
Jun. 30, 2017  (FR) ...................................... 17/56133

(51) Int. Cl.
*B29C 48/12*    (2019.01)
*B29C 48/35*    (2019.01)
(Continued)

(52) U.S. Cl.
CPC ............ *B29C 48/12* (2019.02); *B29C 48/025* (2019.02); *B29C 48/13* (2019.02); *B29C 48/21* (2019.02);
(Continued)

(58) Field of Classification Search
CPC ....... B29C 48/12; B29C 48/025; B29C 48/13; B29C 48/21; B29C 48/307; B29C 48/35;
(Continued)

(56) References Cited

U.S. PATENT DOCUMENTS 3,814,160 A  *  6/1974  Creasey ................ B60C 11/005
                                                152/209.5
4,478,266 A  *  10/1984  Pierson ................. B60C 11/005
                                                152/209.5
(Continued)

FOREIGN PATENT DOCUMENTS

DE        4019186 A1    12/1990
EP        0201337 A2    11/1986
(Continued)

OTHER PUBLICATIONS

International Search Report issued in PCT/FR2018/051599 dated Dec. 11, 2018.

*Primary Examiner* — Jeffrey M Wollschlager
(74) *Attorney, Agent, or Firm* — Dickinson Wright PLLC; Steven C. Hurles

(57) ABSTRACT

The method for the coextrusion of a complex profiled element made up of the assembly of profiled elements formed from distinct rubber compounds. A coextrusion machine comprises upstream and downstream extruders which deliver into an extrusion cavity. A first profiled element, formed of the first rubber compound, is created. The first profiled element comprises at least a first profiled-element portion which is intended to form a longitudinal (Continued)

insert, a base of which is in continuity of material with the first profiled element. A complex profiled element formed of the first and second rubber compounds is created. The insert is circulated between walls of a channel extend in a longitudinal direction between the upstream profiling blade and the downstream profiling blade and together form a concave surface open towards the inside of the extrusion cavity in such a way that the bringing-together of the lateral walls of the insert with the second compound takes place only in the downstream gap.

15 Claims, 7 Drawing Sheets

(51) Int. Cl.
    *B29C 48/025*     (2019.01)
    *B29C 48/13*     (2019.01)
    *B29C 48/21*     (2019.01)
    *B29C 48/49*     (2019.01)
    *B29C 48/305*     (2019.01)
    *B29K 105/24*     (2006.01)
    *B29L 30/00*     (2006.01)
    *B29C 48/07*     (2019.01)

(52) U.S. Cl.
    CPC ............ *B29C 48/307* (2019.02); *B29C 48/35* (2019.02); *B29C 48/49* (2019.02); *B29C 48/07* (2019.02); *B29K 2105/246* (2013.01); *B29L 2030/002* (2013.01)

(58) Field of Classification Search
    CPC ....... B29C 48/49; B29C 48/07; B29C 48/304; B29C 48/2556; B29C 48/18; B29C 48/022; B29K 2105/246; B29K 2007/00; B29K 2021/00; B29L 2030/002; B29L 2030/00; B29D 30/06; B29D 30/62; B29D 30/08; B60C 11/005; B60C 11/0058
See application file for complete search history.

(56) References Cited

U.S. PATENT DOCUMENTS

| | | | | |
|---|---|---|---|---|
| 4,526,528 | A * | 7/1985 | Kline | B29C 48/21 |
| | | | | 264/173.17 |
| 5,017,118 | A * | 5/1991 | Looman | B29C 48/12 |
| | | | | 425/467 |
| 5,453,238 | A * | 9/1995 | Bardy | B29C 48/12 |
| | | | | 425/327 |
| 6,269,854 | B1 * | 8/2001 | Matsuo | B60C 11/005 |
| | | | | 152/DIG. 2 |
| 6,695,606 | B1 | 2/2004 | Burg et al. | |
| 6,994,817 | B2 * | 2/2006 | Calvar | B60C 19/08 |
| | | | | 264/173.17 |
| 7,188,651 | B2 * | 3/2007 | Suzuki | B60C 11/0058 |
| | | | | 152/209.5 |
| 7,334,618 | B2 * | 2/2008 | Suzuki | B60C 11/00 |
| | | | | 152/DIG. 2 |
| 8,414,284 | B2 * | 4/2013 | Vargo | B29C 48/05 |
| | | | | 425/374 |
| 9,027,615 | B2 * | 5/2015 | Dermience | B60C 11/1307 |
| | | | | 152/905 |
| 9,050,859 | B2 * | 6/2015 | Reinardt | B60C 11/0041 |
| 9,821,524 | B2 * | 11/2017 | Denavit | B29D 30/0681 |
| 10,427,463 | B2 * | 10/2019 | Schweitzer | B60C 1/0016 |
| 10,596,740 | B2 * | 3/2020 | Bessac | B29C 48/21 |
| 2001/0022410 | A1 * | 9/2001 | Benatti | B29C 48/307 |
| | | | | 264/173.17 |
| 2007/0187013 | A1 * | 8/2007 | Losi | B60C 11/18 |
| | | | | 156/111 |
| 2008/0216930 | A1 * | 9/2008 | Valentine | B60C 11/00 |
| | | | | 152/209.5 |
| 2020/0101655 | A1 * | 4/2020 | Rouby | B29C 48/08 |

FOREIGN PATENT DOCUMENTS

| | | |
|---|---|---|
| JP | 2014180785 A | 9/2014 |
| KR | 101405064 B1 | 6/2014 |
| WO | WO2017/109392 A1 | 6/2017 |

* cited by examiner

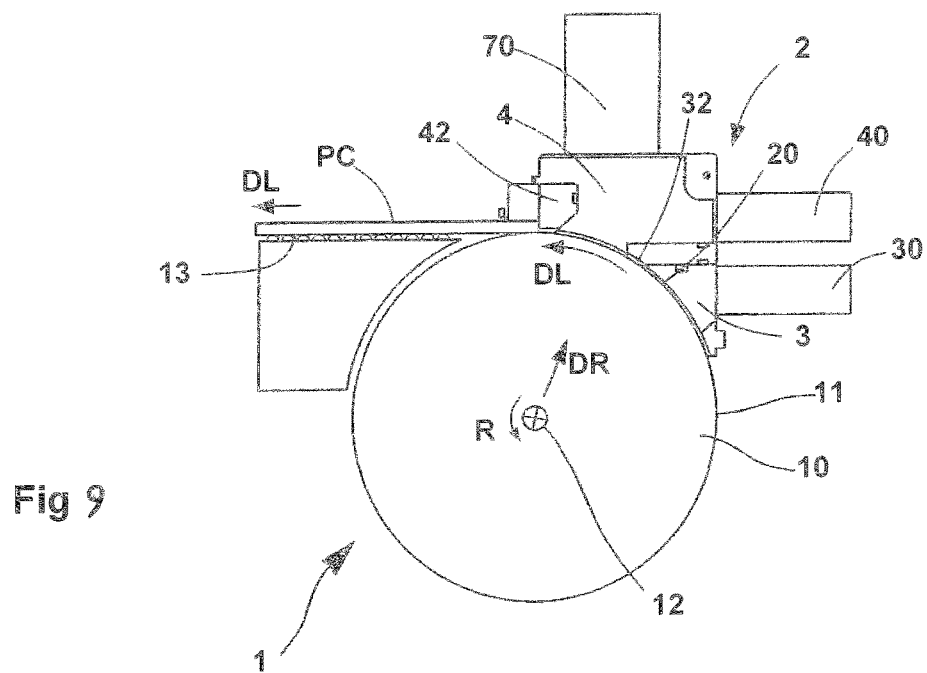
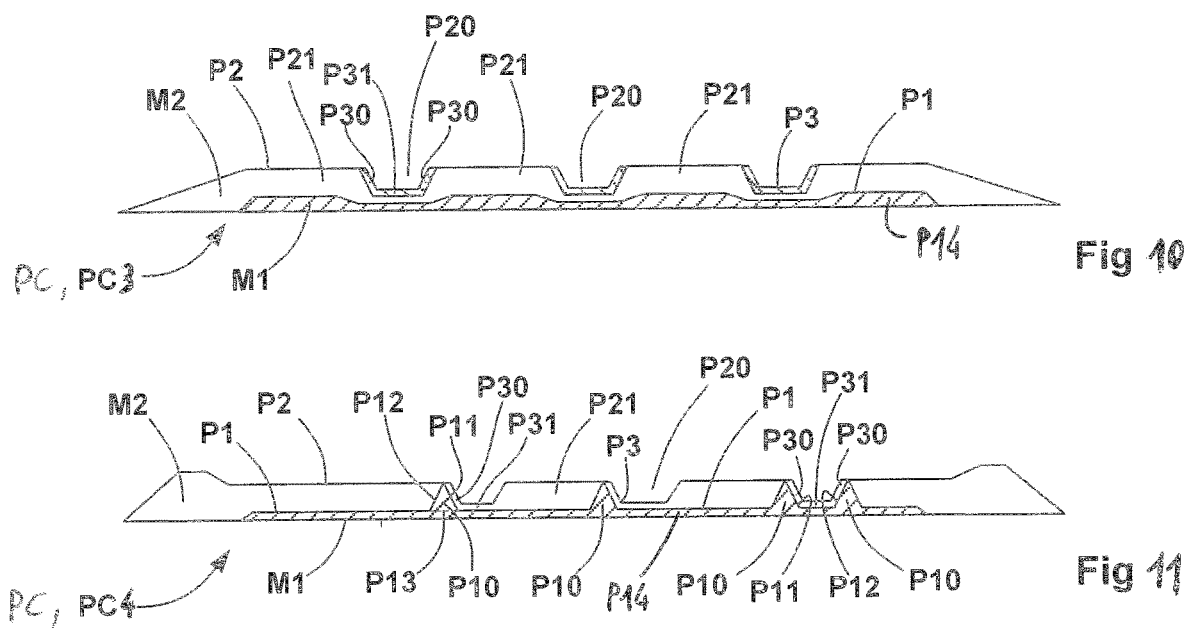

EXTRUSION HEAD WITH CHANNELS FOR PRODUCING INSERTS IN A PROFILED BAND FOR MANUFACTURING A PNEUMATIC TIRE AND CORRESPONDING EXTRUSION METHOD

CROSS-REFERENCE TO RELATED APPLICATIONS

The present application claims priority to PCT International Patent Application No. PCT/FR2018/051599, filed on Jun. 28, 2018, which claims priority to FR 17/56132.

BACKGROUND

1. Field of the Invention

The present disclosure falls within the field of the extrusion of a continuous profiled strip of a rubber-based material intended in particular for the manufacture of pneumatic tires.

2. Related Art

More specifically, the invention relates to the extrusion of complex profiled elements made up of the assembly of several profiled elements made from unvulcanized rubber compounds of different compositions. These complex profiled elements are produced in the known way using a coextrusion machine that employs several extruders opening into a pressure dome and comprising several profiled gaps arranged in such a way that the profiling and final bringing-together of the various profiled elements are performed by the one same profiling blade.

These complex profiled elements are used in particular for creating tire treads.

The transverse cross section through a complex profiled element PC0 is illustrated in FIG. 1. A radially internal first profiled element P1 formed of a compound M1 constitutes the sublayer, and a second profiled element P2 formed of a compound M2 is the precursor of the tread that is intended to come into contact with the ground. Longitudinal grooves P20, that are the precursors of the longitudinal grooves of the tire, are positioned between the longitudinal ribs P21 in which the blocks that form the final tread pattern of the tire are moulded During the building of a green tire, the green tire in the form of a torus is covered with a length of strip taken from a continuous strip obtained using the coextrusion machine.

It is also known practice to use machines comprising a coextrusion head in order to create complex profiles comprising a localized insert. These machines have been developed following the appearance of silica-based compounds which are not very good conductors of electricity in order to address the problem of the flow of electric charge in the vehicle.

Thus, document EP1448355 describes a coextrusion machine comprising a roller and an extrusion head comprising at least two ducts for the flow of a sublayer rubber compound and of a tread rubber compound, the said ducts opening onto an extrusion orifice through which the two, sublayer and tread, rubber compounds are discharged.

The extrusion head also comprises a micro-extruder of a third, electrically conducting, rubber compound, which micro-extruder is equipped at its end with a nozzle passing through the two flow ducts so that the electrically conducting third rubber compound is inserted into the sublayer and tread rubber compounds upstream of the extrusion orifice.

Publication EP 0 925 903 describes a so-called flat-nosed (rollerless) coextrusion machine comprising an extrusion head comprising a first passage for extruding the tread and a second passage for extruding the sublayer considered as being electrically conductive. A third passage, arranged as a branch off the second passage, opens onto a slotted opening arranged to the rear of the extrusion orifice so as to form a narrow electrically conducting strip passing through that part of the tread that is a poor conductor of electricity.

SUMMARY OF THE INVENTION

The disclosure is also concerned with the manufacture of complex profiled elements intended to form the tread of a tire and comprising one or more inserts. These treads of a novel type, which are described for example in publication WO2016/202703, comprise anchoring elements intended to reinforce the tread pattern blocks in the event of transverse loading of the tire.

The anchoring elements may be formed from the same compound as or from a different compound from that of which the sublayer is made.

The disclosure is also concerned with the manufacture of complex profiled elements intended to form the tread of a tire, the said profiled elements being able to comprise small-thickness structures which form inserts or edging rubber and the profile of which can be disturbed in the absence of special implementation devices.

By way of example, for protection and resistance reasons, it may prove advantageous to produce treads in which the walls of the longitudinal grooves are covered with a small-thickness edging rubber of a different composition from the composition of the compound that forms the tread. This arrangement in particular makes it possible to reduce the spread of cuts connected with attacks or the penetration of gravel.

On another note, it may prove necessary to use edging rubber of the type described hereinabove to protect treads comprising inserts positioned near the edge of a groove.

According to the disclosure, there is proposed a method for the coextrusion of a complex profiled element made up of the assembly of profiled elements formed from distinct rubber compounds, in which, using a coextrusion machine comprising an upstream extruder and a downstream extruder delivering into an extrusion cavity formed by the space comprised between a lower wall of an extrusion head and a profiling wall positioned opposite the lower wall.

The said method implements the steps during which:
  using the upstream extruder, a first rubber compound which emerges from an upstream extrusion canal in the lower wall of the extrusion head is delivered upstream of a first profiling blade referred to as the "upstream profiling blade",
  a first profiled element, formed of the first rubber compound, is created in an upstream gap which is defined by the upstream profiling blade and the profiling wall, the said first profiled element comprising at least a first profiled-element portion which is intended to form a sublayer and at least a second profiled-element portion which is intended to form a longitudinal insert, a base of which is in continuity of material with the said sublayer, and which on the said sublayer forms a protrusion lateral walls of which extend outwards with respect to an external surface of the said first profiled element,
  using the downstream extruder, a second rubber compound is delivered via a downstream extrusion canal which opens into the lower wall of the extrusion head downstream of the upstream profiling blade, and the second rubber compound is brought together with the radially external surface of the first profiled element at the region where the stream of second rubber compound meets the stream of first rubber compound, the first profiled element and the second rubber compound are passed through a downstream gap which is positioned downstream of the downstream extrusion canal and which is defined by a second profiling blade, referred to as the "downstream profiling blade", and the profiling wall, so as to create a complex profiled element formed of the first and of the second rubber compounds.

This method is characterized in that a portion of the first rubber compound, intended to form the insert, is circulated between walls of a channel which extend in a longitudinal direction between the upstream profiling blade and the downstream profiling blade, from an upstream end of the channel which is situated upstream of the meeting of the streams of the first and second rubber compounds, as far as a downstream end of the said channel which is situated downstream of the said meeting of the streams and upstream of the downstream profiling blade, the said walls of the channel together forming a concave surface open towards the inside of the extrusion cavity and being positioned in such a way that the portion of the first rubber compound that enters the channel and that is intended to form the insert, as it progresses longitudinally along the channel, remains in continuity of material with the sublayer without being brought into contact with the second compound, and so that the bringing-together of one or more lateral walls of the said insert with the second rubber compound then takes place in the downstream gap defined by the downstream profiling blade and the profiling wall.

The first compound coming from the upstream extruder therefore enters the channel under pressure and remains in continuity of material with the compound that forms the sublayer because of the opening of the concavity of the channel on the side of the said sublayer positioned radially towards the inside with respect to the channel.

On leaving the second extrusion canal fed by a second extruder, the second compound comes together with the radially external surface of the first profiled element in the longitudinal space situated between the upstream profiling blade and the downstream profiling blade. Further, the uniting of these streams is liable to generate significant movements of material within the second compound in radial or transverse directions, particularly when the first and the second compounds have different rheologies.

Throughout its longitudinal progression along the channel between the outlet from the first profiling blade and the inlet to the second profiling blade, that portion of the first compound that is intended to form the insert is not in contact with the second compound, thereby preventing the profile of the insert from being deformed by the second compound.

As a result, advantageously, the bringing-together of the lateral walls of the insert with the second compound subsequently takes place solely in the downstream gap.

This method thus makes it possible to protect the profile of the insert, in that part of the dome formed by the lower wall and by the wall of the roller situated between the upstream gap and the downstream gap, from the effects connected with the bringing-together of the first profiled element P1 with the second compound M2 and that takes place in the region situated between the two gaps, creating turbulence associated with the variations in pressure.

The method according to the disclosure may also comprise the following features, on their own or in combination:

The second compound is brought together with each of the lateral walls of at least one insert.

The second compound is brought together with just one of the lateral walls of at least one insert.

As it progresses along the channel, the cross section of the insert on a plane perpendicular to the longitudinal direction decreases between the exit from the upstream gap and the entry to the downstream gap.

At the entry to the downstream gap, the cross section of the insert on a plane perpendicular to the longitudinal direction is triangular in shape.

On leaving the downstream gap, an external vertex of the insert lies flush with the external surface of the complex profiled element.

A first profiled element that has no discontinuity in a transverse direction is extruded.

The overall width of the first profiled element that has no discontinuity, considered in the transverse direction, represents more than half, and more preferably at least 70%, of the overall width of the complex profiled element PC obtained.

The walls of the channel extend from the upstream gap to the downstream gap.

The profiling wall may be fixed, or the lower wall of the extrusion head has a concave shape with a cylindrical profile the given axis of which extends transversely and a circumferential direction of which coincides with the longitudinal direction defining the direction of progress of the profiled element through the machine, and the profiling wall is formed by a cylindrical roller, capable of rotating about an axis coinciding with the axis of the lower wall, a radially external wall of which forms the said profiling wall, the downstream profiling blade may comprise at least one projection to form a longitudinal groove in the complex profiled element, whereas the insert is placed at the boundary of a lateral edge of the said groove so that a lateral wall of the said insert formed the edge of the said groove, and it is possible, using an ancillary extruder, to deliver a third rubber compound via an ancillary extrusion canal which opens into an upstream part of the projection, the said ancillary extrusion canal comprising outlet openings positioned at the edge of the said projection and forming one or more lateral outlet openings and a lower outlet opening, so that an edging rubber which comprises a groove-bottom edging rubber applied to the bottom of the groove by the lower outlet opening and at least one lateral edging rubber applied to the lateral wall of the insert by a lateral outlet opening can be applied in the groove of the complex profiled element, a third rubber compound, which has the same composition as the second rubber compound, is used to form the edging rubber.

This method is also particularly well suited to creating a complex profiled element used as a component in the production of a tire and in particular as the tread of such a tire.

Implementation of this method is made possible through the use of a suitable extrusion head.

This head for the extrusion of a complex profiled element made up of the assembly of profiled elements formed from distinct rubber compounds, is intended to be mounted on a coextrusion machine through which the profiled elements progress in an extrusion cavity in a direction of extrusion extending from upstream to downstream, defining a longitudinal direction, the said extrusion head comprising a lower wall partially delimiting the said extrusion cavity and, from upstream towards downstream of the said lower wall in the longitudinal direction:

- an upstream extrusion unit comprising an upstream extrusion canal, placed at the outlet of an upstream extruder and opening into the lower wall,
- an upstream profiling blade, positioned transversely downstream of the upstream extrusion canal to determine a first transverse profile of a first profiled element,
- a downstream extrusion unit comprising a downstream extrusion canal, placed at the outlet of a downstream extruder and opening into the lower wall downstream of the upstream profiling blade,
- a downstream profiling blade, positioned transversely downstream of the downstream extrusion canal to determine a transverse profile of the complex profiled element.

The extrusion head is characterized in that it comprises at least one channel, formed of walls extending in the longitudinal direction between the upstream profiling blade and the downstream profiling blade, together forming a concave surface open towards the inside of the extrusion cavity and defining a duct that is open at its two longitudinal ends.

More specifically, the disclosure relates to an extrusion head for extruding a complex profiled element made up of the assembly of profiled elements formed from distinct rubber compounds, intended to be mounted on a coextrusion machine through which the profiled elements progress in an extrusion cavity in a direction of extrusion extending from upstream to downstream, defining a longitudinal direction, the said extrusion head comprising a lower wall which partially delimits the said extrusion cavity and, from upstream towards downstream of the said lower wall in the longitudinal direction:

- an upstream extrusion unit comprising an upstream extrusion canal which is positioned at the outlet of an upstream extruder and which opens into the lower wall so as to be able to deliver a stream of a first rubber compound,
- an upstream profiling blade, positioned transversely downstream of the upstream extrusion canal to determine a first transverse profile of a first profiled element formed from the said stream of first rubber compound,
- a downstream extrusion unit comprising a downstream extrusion canal which is positioned at the outlet of a downstream extruder and which opens into the lower wall downstream of the upstream profiling blade so as to be able to deliver a stream of a second rubber compound and bring the said stream of second compound together with the stream of first rubber compound in a stream meeting region,
- a downstream profiling blade which is positioned transversely downstream of the downstream extrusion canal and of the stream combining region, to determine a transverse profile of the complex profiled element formed from the first and second rubber compounds.

This extrusion head may be characterized in that it comprises at least one channel, formed by walls which extend in the longitudinal direction between the upstream profiling blade and the downstream profiling blade, from an upstream end of the channel which is situated upstream of the region in which the streams of the first and second rubber compounds meet, as far as a downstream end of the said channel which is situated downstream of the said region in which the streams meet and upstream of the downstream profiling blade, the said walls of the channel together forming a concave surface open towards the inside of the extrusion cavity and being positioned in such a way that, on the one hand, a portion of the stream of the first rubber compound intended to form an insert in the complex profiled element can enter the channel and progress longitudinally in the said channel without being brought into contact with the second rubber compound but remaining in continuity of material with a sublayer of the first profiled element made of the first rubber compound, which will have been formed in an upstream gap defined by the upstream profiling blade, and that, on the other hand, a bringing-together of one or more lateral walls of the said insert with the second rubber compound then takes place in a downstream gap defined by the downstream profiling blade.

The extrusion head according to the disclosure may also comprise the following features, on their own or in combination:

The upstream end of the channel is positioned in the continuation of an outfall made in the upstream profiling blade, and the downstream end of the channel emerges upstream of the downstream profiling blade.

The concave duct of the channel is formed of a first and of a second lateral wall, and of a wall constituting the bottom of the channel.

The first and the second lateral walls of a channel are respectively supported by a first and a second lateral partition the thickness of which is less than 2 mm, and preferably less than 1 mm.

At the downstream end of the channel, the wall that forms the bottom of the channel is positioned at the same level as the wall of the downstream profiling blade.

The transverse cross section of a channel on a plane perpendicular to the longitudinal direction decreases continuously in the direction from the upstream end towards the downstream end of the channel so that the said cross section is at a minimum at the downstream end of the channel.

At the downstream end, the transverse cross section of a channel on a plane perpendicular to the longitudinal direction is triangular in shape.

The downstream profiling blade comprises at least one projection extending towards the inside of the extrusion cavity and intended to form a continuous longitudinal groove in the complex profiled element.

At least one channel emerges between two projections.

The downstream extrusion canal comprises at least one divider element, extending longitudinally between the upstream profiling blade and the downstream profiling blade, in the longitudinal continuation of a projection and dividing the downstream extrusion canal into sub-canals.

At least one channel comprises a lateral wall that is coincident with the lateral wall of a divider element.

At the downstream profiling blade, the internal wall of the divider element is positioned at the same level as the internal wall of the projection situated in the continuation thereof.

According to one preferred feature, which may constitute a wholly separate disclosure, alone or in combination with the above-mentioned features, the disclosure may relate to an extrusion head for extruding a complex profiled element made up of the assembly of several profiled elements formed from distinct rubber compounds, and intended to be mounted on a coextrusion machine through which the profiled elements progress in an extrusion cavity in a direction of extrusion extending from upstream to downstream, defining a longitudinal direction, the said head comprising a lower wall which partially delimits the said extrusion cavity, and a downstream extrusion unit comprising a downstream profiling blade positioned in a transverse direction to determine a transverse profile of the complex profiled element formed from the assembling of the assembly of profiled elements, the said downstream profiling blade comprising at least one projection intended to form a groove in the complex profiled element, the said extrusion head being characterized in that it comprises at least one ancillary extrusion canal positioned at the outlet of an ancillary extruder and opening into an upstream part of the projection, the said ancillary extrusion canal comprising a lower outlet opening and at least one lateral outlet opening, these being open at the edge respectively of a lower wall of the said projection and of at least one lateral wall of the said projection.

The lateral openings of the ancillary extrusion canal form openings via which the compound arriving from the ancillary extruder is extruded to form an edging rubber on the bottom of the groove and on at least one of the lateral walls of the groove. As will be seen later on, the thickness of this edging rubber can be adjusted by altering the position of the partitions supporting the walls that define the ancillary extradition canal and by modifying the outlet cross section of the lateral openings.

The particular layout of the ancillary extrusion canal which is positioned in the downstream profiling blade just upstream of the projection, makes it possible to avoid the profile of the edging rubber, the thickness of which is relatively small, being impaired during the bringing together with the rubbers or with the profiled elements arriving from the upstream part of the machine and which, when assembled in the gap formed by the downstream profiling blade, are intended to form the final complex profiled element.

The extrusion head according to the disclosure can also comprise the following features, on their own or in combination:

The ancillary extrusion canal comprises at least one lateral wall laterally distant from the lateral wall of the projection by a value d, so that the opening between these two walls defines a lateral outlet opening.

The ancillary extrusion canal comprises an upstream wall substantially perpendicular to the longitudinal direction, in which a plane, passing through a lower edge of the upstream wall and of the lateral wall of the ancillary extrusion canal, is positioned at a distance a value e short of the position of a lower wall of the projection, so that the opening between this plane and the lower wall of the projection defines a lower outlet opening.

The extrusion head also comprises, progressing in the longitudinal direction from upstream towards downstream,
  an upstream extrusion unit comprising an upstream extrusion canal, placed at the outlet of an upstream extruder and opening into the lower wall upstream of an upstream profiling blade,
  a downstream extrusion unit comprising a downstream extrusion canal, placed at the outlet of a downstream extruder and opening into the said lower wall downstream of the upstream profiling blade and upstream of the downstream profiling blade, The downstream extrusion canal comprises divider elements, extending longitudinally between the upstream profiling blade and the downstream profiling blade, in the longitudinal continuation of the projections of the downstream profiling blade, and dividing the said downstream extrusion canal into sub-canals.

Of course, on the one hand, one or more channels as described hereinabove, intended to shape one or more corresponding inserts made from the first compound and to prevent these inserts from becoming deformed by the second compound and, on the other hand, openings that make it possible to form an edging rubber which notably covers at least one lateral wall of such an insert, may advantageously be combined within an extrusion head.

By virtue of such a combination, it will in particular advantageously be possible on the one hand to create at least one insert positioned at the edge of a longitudinal groove of the complex profiled element in order to reinforce and transversely stiffen tread pattern blocks of the tread as indicated above and, on the other hand, to cover the lateral wall of the said insert that borders the longitudinal groove with a thin layer of edging rubber.

For preference, the edging rubber covering the lateral wall of the insert bordering the groove will have the same composition as the second compound that constitutes the blocks of the tread pattern of the tread, something which makes it possible to obtain a uniform composition for the tread, and notably for the walls to delimit the said longitudinal groove and for the blocks of the tread pattern of the said tread, while at the same time maintaining the benefit of the tread pattern block transverse retention afforded by the said insert.

Such chemical uniformity of the walls of the groove will notably make it possible easily to incorporate into the said groove structures of the flexible leaf or baffle type which are intended to slow the progress, along the groove, of the noise of air associated with running but without, as a result, impeding the flow of water on a wet road surface; specifically, because the walls of the groove all have the same composition, it may advantageously be possible to create sets of flexible leaves each fixed to a different wall of the groove without there being a need to adapt the attachment method to suit the composition of the wall concerned.

In fact, the extrusion head according to the disclosure may, separately or in combination with one another, or with one or another of the aforementioned features, exhibit the following features:

The extrusion head comprises one or several channels formed
  of a lateral wall,
  of a lateral wall positioned facing the previous one and formed by a lateral wall of a divider element, and
  of a wall that forms the bottom of the channel,
the said walls extending in the longitudinal direction between the upstream profiling blade and the downstream profiling blade, together forming a continuous concave surface open radially towards the inside of the cavity and defining a duct that is open at its two longitudinal ends.

A downstream end of the channel opens onto the inlet of the downstream profiling blade, and an upstream end of the channel is positioned at the outlet of the upstream profiling blade in the continuation of an outfall made in the said upstream profiling blade.

The lateral wall of the channel is supported by a lateral partition with a thickness less than 2 mm, and preferably less than 1 mm.

At the downstream end, the wall that forms the bottom of the channel is positioned at the same level as the wall of the downstream profiling blade.

The transverse cross section of a channel on a plane perpendicular to the longitudinal direction decreases continuously in the direction from the upstream end of the channel towards the downstream end of the channel so that the said cross section of the channel is at a minimum at the said downstream end.

At the downstream end, the transverse cross section of a channel on a plane perpendicular to the longitudinal direction is substantially triangular in shape.

More specifically, in addition to the above-mentioned layout of the channel (or channels), the extrusion head may comprise, separately or in combination with one and/or another of the features described hereinabove, a downstream profiling blade which comprises at least one projection to form a longitudinal groove in the complex profiled element, and a channel which is arranged in such a way as to position the insert at the boundary of a lateral edge of the said groove so that a lateral wall of the said insert forms the wall of the said groove, while the ancillary extrusion canal comprises outlet openings positioned at the edge of the said projection, upstream of the said projection, and forming one or more lateral outlet openings and a lower outlet opening, so that an edging rubber which contains a groove-bottom edging rubber applied on the bottom of the tread-groove by the lower outlet opening and at least one lateral edging rubber applied on the lateral wall of the insert by a lateral outlet opening can be applied to the groove of the complex profiled element.

The disclosure also relates to a machine for the coextrusion of a profiled element made up of the assembly of profiled elements formed from distinct rubber compounds, comprising:
- an extrusion head according to any one of the above features,
- a profiling wall positioned facing the lower wall of the extrusion head and forming a gap with the upstream and downstream profiling blades for extruding profiled elements that form the complex profiled element.

The profiling wall may be fixed, or, alternatively, the lower wall of the extrusion head has a concave shape with a cylindrical profile the given axis of which extends transversely, and a circumferential direction of which coincides with the longitudinal direction defining the direction of progress of the profiled element in the extrusion cavity, and the profiling wall is formed by the radially external wall of a cylindrical roller, capable of rotating about an axis coinciding with the axis of the lower wall.

BRIEF DESCRIPTION OF THE DRAWINGS

The disclosure will be understood better from studying the appended figures, which are provided by way of example and are in no way limiting, and in which:

FIG. 9 is a view in the transverse direction of an alternative form of extrusion machine that can be used to implement the disclosure.

FIG. 10 is a view in cross section on a plane perpendicular to the longitudinal direction, of a complex profiled element produced using an extrusion head according to a third embodiment in which openings are used to apply edging rubber to the walls of tread-grooves.

FIG. 11 is a view in cross section on a plane perpendicular to the longitudinal direction, of a complex profiled element produced using an extrusion head according to a fourth embodiment of the disclosure.

DETAILED DESCRIPTION OF THE ENABLING EMBODIMENTS

Figure 1:
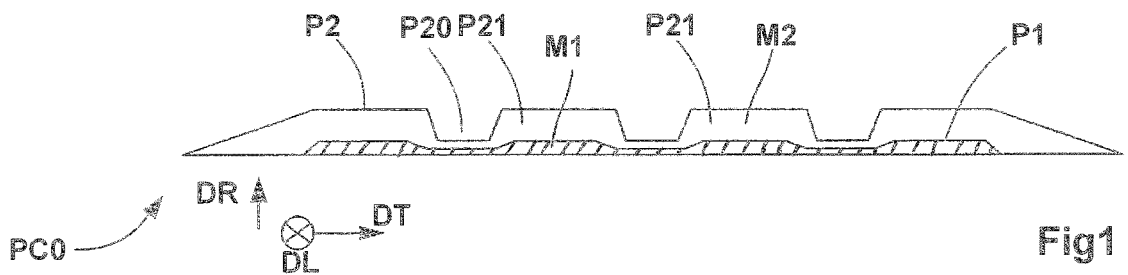
FIG. 1 depicts the transverse profile of a complex profiled element according to the known prior art.
Figure 2:
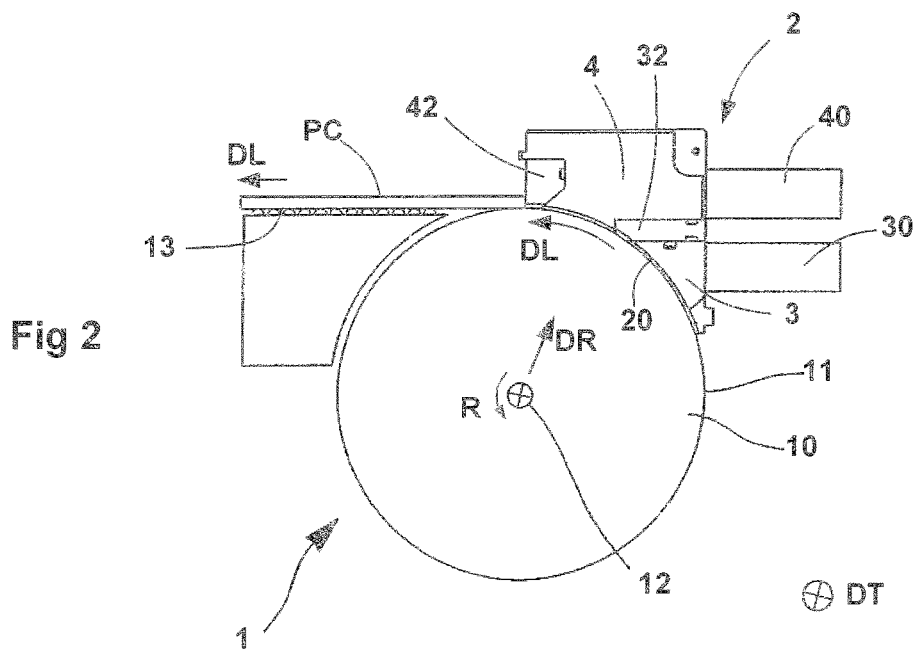
FIG. 2 is a view in the transverse direction of an extrusion machine according to the disclosure.

In one preferred form of execution of the disclosure, that serves as the basis for the present description, the coextrusion machine depicted in FIG. 2 comprises a cylindrical roller 10 rotated about an axis 12 by a drive assembly (not depicted). The generatrices of the roller extend in a transverse direction DT and form an extrusion wall here defined by the radially external wall 11 of the roller 10.

The extrusion head 2 comprises an upstream extrusion unit 3 which is associated with an extruder 30 supplying a first compound M1, and a downstream extrusion unit 4 which is associated with a downstream extruder 40 supplying a second compound M2.

For preference, the disclosure applies to compounds M1, M2 based on rubber, and notably based on what is referred to as "raw", which means to say unvulcanized, rubber, which means that in what follows, reference will preferably be made to "rubber compounds".

That being the case, in absolute terms, the disclosure could of course be applied to other types of first and second compounds M1, M2, and notably to any suitable polymer mixtures, possibly other than compounds based on rubber.

In what follows, for the sake of the convenience of the description, reference will be made to "compounds" or "rubber compounds" indifferently.

The radially internal lower wall 20 of the extrusion head 2 has a cylindrical overall shape of axis 12 and is positioned facing the radially external wall 11 of the roller 10. The space contained between the lower wall and the radially external wall of the roller forms an extrusion cavity or dome in which the pressurized compound is shaped as it passes through the gaps, in this instance an upstream gap defined by the radially external wall 11 of the roller 10 and by an upstream profiling blade 32 and, respectively, a downstream gap defined by the radially external wall 11 of the roller 10 and by downstream profiling blade 42, the said upstream 32 and downstream 42 profiling blades forming an integral part of the extrusion head.

The radial distance between the lower wall of the extrusion head 2 and the radially external wall of the roller 10 at the two transverse ends is of the order of a few tenths of a millimetre in order to limit leaks of rubber compound.

The roller 10 allows better driving of the complex profiled element that is in the process of being extruded, in the longitudinal direction DL, and in particular makes it possible to reduce the edge effects at the base of the complex profiled element in contact with the radially external wall 11 of the roller.

The complex profiled element PC is directed in the longitudinal direction DL towards the downstream part of the extrusion machine on a belt 13.

Alternatively, it is entirely possible to implement the disclosure using a coextrusion machine of the so-called flat-nosed type, in which the extrusion wall defining the gaps to the upstream and downstream profiling blades and that faces the lower wall of the extrusion head, is fixed.

For the sake of the clarity of the description that follows, reference will be made to this alternative form of embodiment as far as is necessary, giving consideration to the fact that, in most cases, anything stated with regard to an extrusion machine comprising a roller applies mutatis mutandis to a flat-nosed extruder.

The direction of rotation R of the roller determines the direction in which the profiled element progresses in the extrusion cavity of the machine, which is likened to the longitudinal direction DL. The radial direction DR therefore corresponds to a direction locally perpendicular to the transverse direction DT and to the longitudinal direction DL, and the direction directed radially towards the inside, or the radially internal direction, corresponds to an orientation towards the inside of the extrusion cavity. Thus, when a first point is positioned in a position that is radially lower with respect to a second point, that means that the value of the distance between the first point and the second point in a direction perpendicular to the longitudinal direction and to the transverse direction and oriented in a direction measured from the centre of the cavity towards the outside, is positive. Likewise, and using the same logic, the terms "lower" and "radially lower", the terms "higher" or "radially higher", the terms "external" or "radially external" or else the terms "internal" or "radially internal" are considered as being equivalent.

Figure 3:
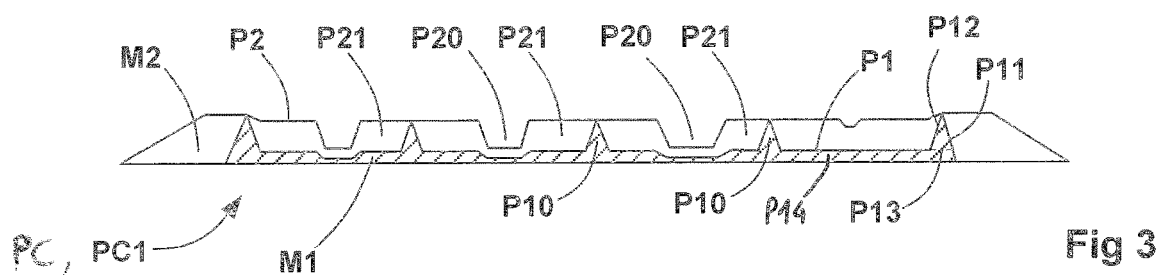
FIG. 3 is a view in cross section on a plane perpendicular to the longitudinal direction, of a complex profiled element produced using an extrusion head according to a first embodiment of the disclosure.

FIG. 3 depicts a first complex profiled element PC1 comprising a first profiled element P1 made of a first compound M1 intended to form a radially internal first layer, and a second profiled element P2, made of a second compound M2 intended to form, radially on top of the first layer formed by the first profiled element P1, a tread.

The profile of the tread comprises longitudinal grooves P20 that are the precursors of the tread-grooves of the tire, the said longitudinal grooves P20 being interposed between longitudinal ribs P21 that are intended to form blocks of tread pattern of the tread.

For the convenience of the description, the longitudinal grooves P20 can be likened to the longitudinal tread-grooves of which the former grooves are the precursors.

The complex profiled element PC1 also comprises longitudinal inserts P10 which are made of the first compound M1, and here have a triangular overall shape and extend upward in the radial direction DR from a fictional base P13 situated on the radially external face of a sublayer P14 made from this same first compound M1. Here, the said inserts P10 extend up as far as the radially external surface of the second profiled element P2.

For the simple convenience of the description, a fictional distinction may be made by considering that the first profiled element P1 comprises, on the one hand, a first profiled-element portion which is intended to form a sublayer P14 and, on the other hand, a second profiled-element portion (or respectively several second profiled-element portions) intended to form an insert P10 (or, respectively, several inserts P10), even though these elements, insert P10 and sublayer 14, are in practice preferably formed as a single piece with one another.

These longitudinal inserts P10 are positioned between two longitudinal grooves, in this instance substantially at the centre of a longitudinal rib P21, so that the first lateral wall P11 of the insert and the said second lateral wall P12 of the insert are joined together with the compound M2 that forms the tread.

Figure 4:
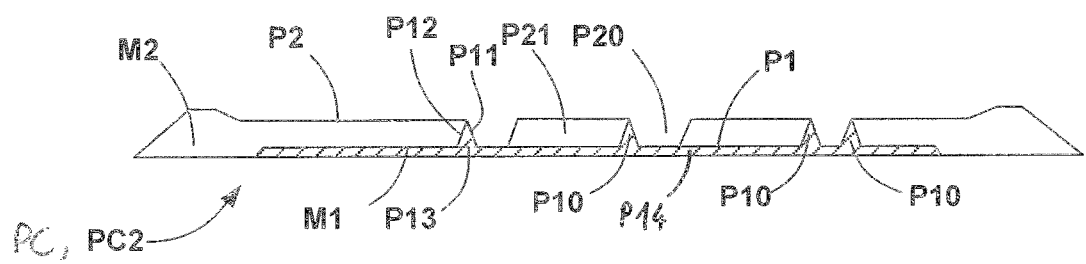
FIG. 4 is a view in cross section on a plane perpendicular to the longitudinal direction, of a complex profiled element produced using an extrusion head according to a second embodiment of the disclosure.

The complex profiled element PC2 depicted in FIG. 4 differs from the complex profiled element PC1 in that the inserts P10 are positioned at the edge of a longitudinal rib P21 at the boundary between the longitudinal rib P21 and the longitudinal tread-groove P20.

Only the first lateral wall P11 or the second lateral wall P12 of an insert is then joined with the compound M2.

It may be seen that the bottom of the tread-groove P20 of the complex profiled element PC2 can be formed here by the first compound M1 of the sublayer P14.

It goes without saying that the distinctive features of these two complex profiled elements PC1 and PC2 can be combined to form a complex profiled element simultaneously comprising inserts positioned in the central part of a rib and inserts positioned at the edge of a rib, each of these inserts being made of the same first compound M1 as that of the sublayer P14.

The extrusion head according to the disclosure has been developed to make it possible to create complex profiled elements of the kind depicted in FIGS. 3 and 4. However, as will be seen later, it allows the manufacture of numerous alternative forms of insert.

Figure 5:
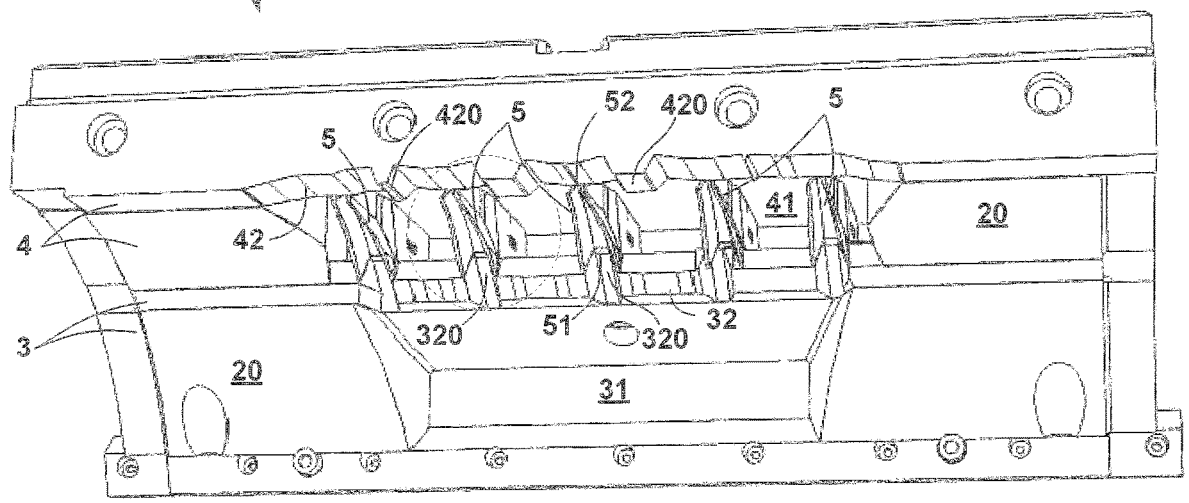
FIG. 5 is a schematic perspective view of the extrusion head according to the first embodiment of the disclosure.
Figure 6:
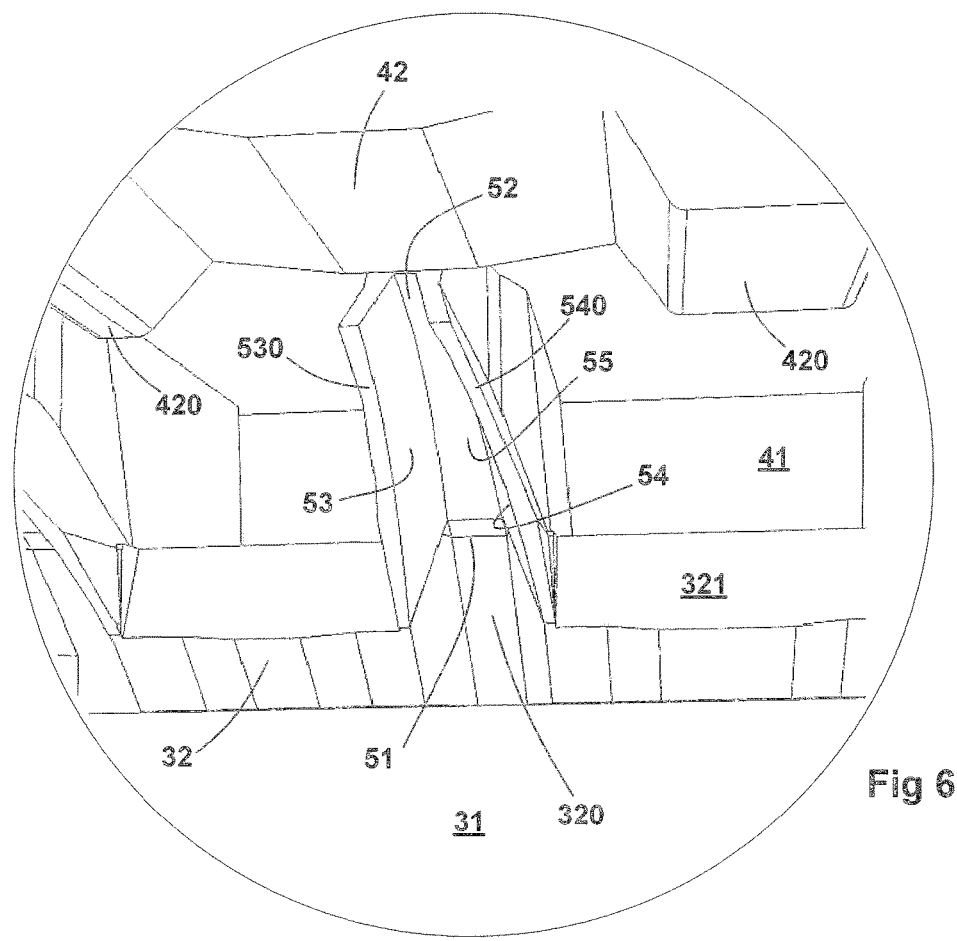
FIG. 6 is a detail view of that part of the extrusion head that is ringed in FIG. 5.

FIGS. 5 and 6 show the extrusion head 2 viewed from the side of the lower wall 20, according to a first embodiment of the disclosure.

The upstream extruder (not depicted) in which the first compound M1 is worked, opens into the lower wall 20 via an upstream extrusion canal 31, upstream (in the sense of the longitudinal direction DL) of a first profiling blade 32 referred to as "upstream profiling blade 32".

This upstream profiling blade 32, the transverse profile of which is designed to shape the first profiled element P1 intended to form the sublayer P14, defines a gap, referred to as "upstream gap" with the radially external wall 11 of the roller 10. The profiled element P1 is preferably of the kind depicted in FIG. 3 and preferably extends continuously in the transverse direction DT.

The downstream extruder 40 (not depicted), in which the compound M2 is worked, opens via a downstream extrusion canal 41 into the internal wall 20 downstream of the upstream profiling blade 32 and upstream of a second profiling blade 42 referred to as "downstream profiling blade 42".

The stream of compound M2 delivered from the downstream extrusion canal 41 therefore comes into contact with the radially external part of the first profiled element P1 forming the sublayer P14, in this instance more specifically with the radially external surface of the said sublayer P14 as soon as it leaves the downstream extrusion canal 41 directly downstream of the upstream profiling blade 32 and well upstream of the downstream profiling blade 42. The meeting of these two streams may be a source of turbulence liable to alter the profile of the first profiled element P1, particularly of the sublayer P14, and this is why the transverse profile of the upstream profiling blade 32 needs to be adapted accordingly.

The gap between the downstream profiling blade 42 and the radially external surface 11 of the roller 10 serves to determine the transverse profile of the second profiled element P2 and to perfect the bringing-together of the profiled elements P1 and P2 to obtain the complex profiled element PC, PC1.

Thus, there are indeed again, from upstream to downstream:

an upstream extrusion unit 3 comprising an upstream extrusion canal 31 which is positioned at the outlet of an upstream extruder 30 and which opens into the lower wall 20 so as to be able to deliver a stream of a first rubber compound M1, an upstream profiling blade 32, positioned transversely downstream of the upstream extrusion canal 31 to determine a first transverse profile of a first profiled element P1 formed from the said stream of first rubber compound M1, a downstream extrusion unit 4 comprising a downstream extrusion canal 41 which is positioned at the outlet of a downstream extruder 40 and which opens into the lower wall 20 downstream of the upstream profiling blade 32 so as to be able to deliver a stream of a second rubber compound M2 and bring the said stream of second compound together with the stream of first rubber compound M1 in a stream meeting region, and a downstream profiling blade 42 which is positioned transversely downstream of the downstream extrusion canal 41 and of the stream meeting region, to determine a transverse profile of the complex profiled element PC formed from the first and second rubber compounds M1, M2.

Furthermore, in order to prevent the stream of the second compound M2 from deforming the insert or inserts P10 in the stream-meeting region, the extrusion head 2 is advantageously provided with at least one channel 5, and preferably with several channels 5, preferably with as many channels 5 as there are real inserts P10 and which, as will be detailed hereinbelow, will form diversion ducts which (each) capture some of the first compound M1 intended to form the insert P10 in question and which transport this portion of the first compound M1 while keeping it separate, at least temporarily, over a portion of its longitudinal path between the upstream 32 and downstream 42 profiling blades, from the second compound M2 so as to allow this proportion of the first compound M1 which proportion is intended to form the insert P10, to bypass the meeting region without coming into contact with the second compound M2, but while still remaining in continuity of material with the sublayer P14, and to come into contact with the second compound M2 only later, in the downstream gap situated beyond said meeting region sufficiently downstream of said meeting region.

To this end, the extrusion head 2 preferably comprises at least one channel 5, formed by walls 53, 54, 55 which extend in the longitudinal direction DL between the upstream profiling blade 32 and the downstream profiling blade 42, from an upstream end 51 of the channel 5 which end is situated upstream of the meeting region in which the streams of first and second rubber compounds M1, M2 combine, as far as a downstream end 52 of the said channel 5, which downstream end is situated downstream of the said flow-meeting region and upstream of the downstream profiling blade 42.

The said walls 53, 54, 55 of the channel together form a concave surface open towards the inside of the extrusion cavity and are positioned in such a way that:

on the one hand, a portion of the stream of the first rubber compound M1, which portion is intended to form an insert P10 in the complex profiled element PC, can enter the channel 5 and progress longitudinally along the said channel 5 without being brought into contact with the second rubber compound M2 but while remaining in continuity of material with the sublayer P14 of the first profiled element P1, which sublayer P14 will have been shaped in the upstream gap defined by the upstream profiling blade 32, and, on the other hand, a bringing-together of one or more lateral wall(s) P11, P12 of the said insert P10 with the second rubber compound M2 takes place (only) later, in a downstream gap defined by the downstream profiling blade 42.

Advantageously, the disclosure therefore makes it possible to create, in succession, a first confluence (a first meeting of streams) between the first compound M1 and the second compound M2, at which first confluence the second compound M2 comes into first contact with the first compound M1 and, more particularly, into contact with the sublayer P14 forming a first portion of the first profiled element P1, and a distinct second confluence (a second meeting of streams), which is offset downstream with respect to the first confluence, and where this same second compound M2 comes into (second) contact with second elements of this same first profiled element P1, in this instance with the insert or inserts P10 concerned, which, until this second confluence, were as yet unexposed, because they were protected by their respective channels 5 which separated them from the said second compound M2.

For preference, the walls 53, 54, 55 of the channel 5 may extend from the upstream gap as far as the downstream gap, thus covering substantially the entire distance longitudinally separating the upstream profiling blade 32 from the downstream profiling blade 42. This then will afford the most durable, and therefore the most effective, possible protection of the inserts P10 with respect to the second compound M2.

Figure 16:
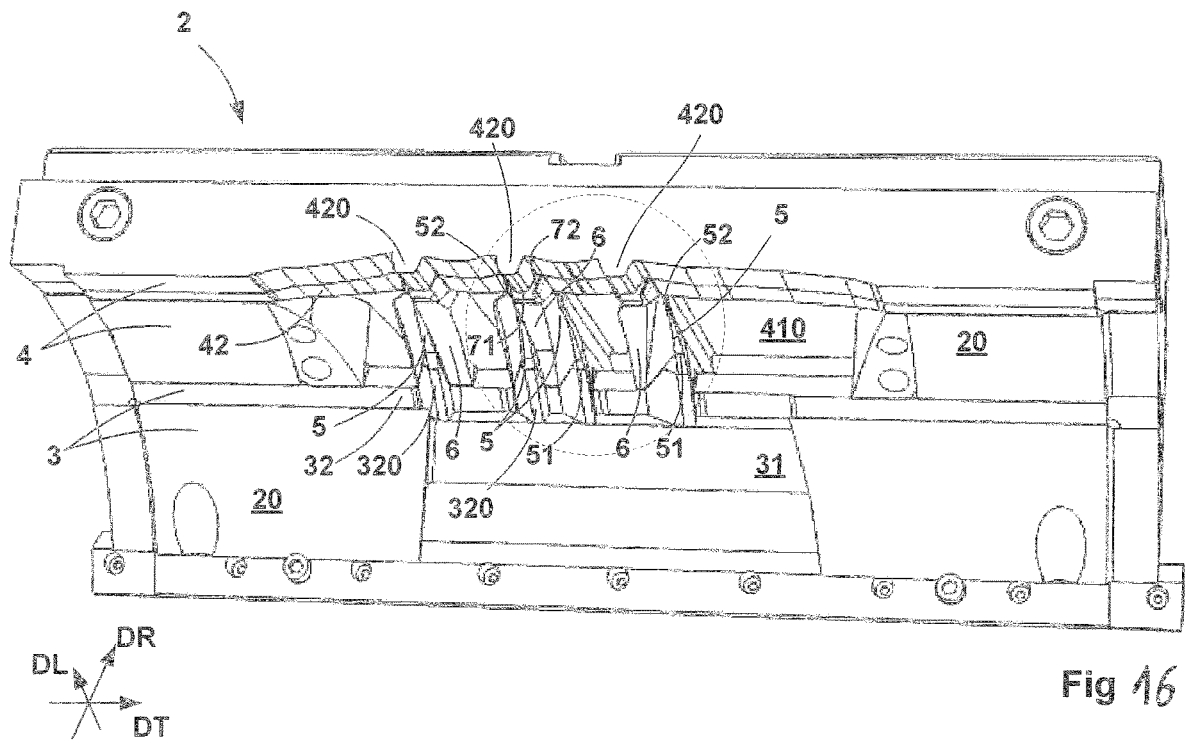
FIG. 16 is a schematic perspective view of the extrusion head according to the fourth embodiment of the disclosure.
Figure 17:
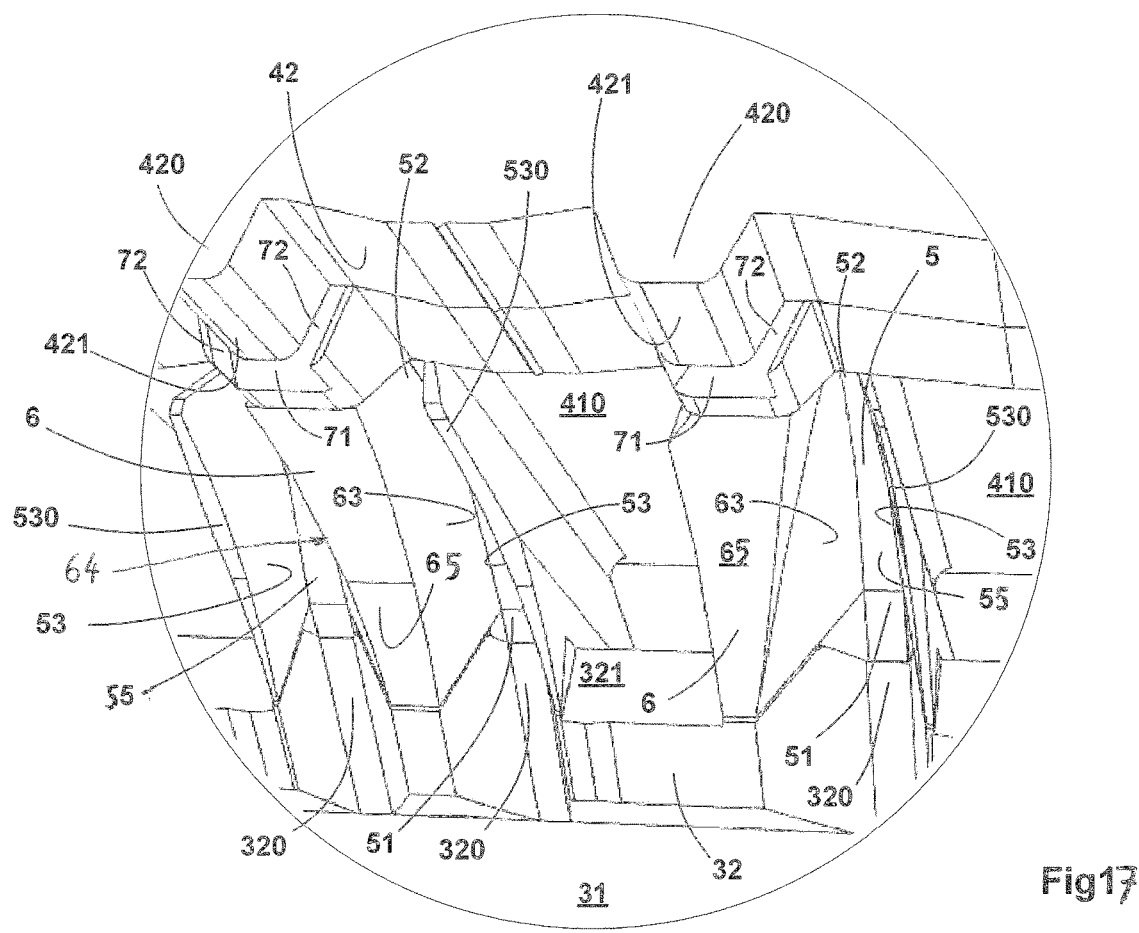
FIG. 17 is a detail view of that part of the extrusion head that is ringed in FIG. 16.

For preference, as illustrated in FIGS. 5, 6, 7 and 8, or else in FIGS. 16 and 17, the extrusion head 2 comprises at least one channel 5 which extends in the longitudinal direction DL and an upstream end 51 of which is positioned in the continuation of an outfall 320 made in the upstream profiling blade 32, and the downstream end 52 of which opens just upstream of the downstream profiling blade 42 in the gap defined by the downstream profiling blade 42 and the radially external surface 11 of the roller 10.

A channel 5 may take the form of a canal, preferably of substantially triangular or trapezoidal cross section, comprising a first lateral wall 53 supported by a first partition 530, a second lateral wall 54 is supported by a second partition 540, and a wall 55 that forms the bottom of the channel.

The walls 53, 54 and 55 together form a continuous concave surface open radially towards the inside and the concavity of which faces the radially external wall 11 of the roller 10.

The walls 53, 54 and 55 of the channel 5 form a sort of duct, in the image of a gutter or of an inverted hull open at its two, upstream 51 and downstream 52, ends.

At the upstream end 51 of the channel 5, the partition 530 is preferably attached to the downstream flank 321 of the upstream profiling blade 32, and the radially lower edge of the partition 530 lies flush with the profile of the upstream profiling blade 32. The upstream profiling blade 32 thus has, at this upstream end 51 of the channel 5, a transverse profile in the form of an outfall 320, the downstream part of which is positioned in continuity with the wall 55 that forms the bottom of the channel, so as to encourage flow of the compound M1 in the channel 5.

At the downstream end 52 of the channel 5, the channel 5 opens directly into the gap formed by the downstream profiling blade 42 and the radially external wall 11 of the roller 10. The channel 5, illustrated in FIGS. 5 and 6 and, as appropriate, in FIGS. 16 and 17, is configured in such a way that the wall 55 that forms the bottom of the channel 5 is positioned radially at the same level as the radial position at this level of the downstream profiling blade 42. By contrast, at this downstream end 52, the partitions 530 and 540 supporting the lateral walls 53 and 54 of the channel 5 extend radially towards the inside at a radial position lower than the position of the downstream profiling blade 42.

However, if it is not necessary to have the insert P10 emerge onto the surface of the tread, it is entirely possible, at the downstream end 52 of the channel 5, to position the wall 55 that forms the bottom of the channel 5 at a radially lower position than that of the radial position of the downstream profiling blade 42.

Thus, while remaining in continuity of material with the compound M1 that forms the sublayer P14, the proportion of compound M1 that enters the channel 5 flows directly from the upstream end 51 to the downstream end 52 without being brought into contact with the compound M2, so that the changes in pressure observed where the stream of compound M2 combines with the stream of compound M1 do not lead to any disruption of the profile conferred upon the compound M1 that has entered the channel 5 and is intended to form the insert P10.

The shaping of the insert P10 occurs throughout the entire progression of the compound M1 along the channel 5, and the profile according to a radial plane passing through the downstream end of the channel 5 corresponds to the profile of the insert P10 of the complex profiled element PC. The bringing-together of the lateral walls P11 and P12 of the insert with the compound M2 that forms the tread therefore takes place directly in the downstream gap defined by the downstream profiling blade 42 and the radially external wall 11 of the roller, without the profile of the insert being modified.

The way in which the pressure in the channel 5 evolves can be controlled by adjusting the angle formed by the lateral walls 53 and 54 with respect to the longitudinal direction DL. These two walls converge towards one another in the direction from upstream towards downstream, for example making an angle of the order of 5° with the longitudinal direction, so that the transverse cross section of the channel on a radial plane or on a plane perpendicular to the longitudinal direction decreases continuously in the direction from the upstream end 51 towards the downstream end 52 of the channel, and so that the said cross section is at a minimum at the downstream end 52.

In the scenario illustrated in FIGS. 5 and 6, the cross section of the channel at the downstream end 52 has a substantially triangular shape corresponding to a preferred embodiment of the insert. However, the shape of this cross section is nonlimiting and can be adapted at will.

According to this first embodiment of the disclosure, the channels 5 illustrated in FIGS. 5 and 6 emerged between two projections 420 of the downstream profiling blade 42. The projections 420 are intended to form the tread-grooves P20 of the complex profiled element illustrated in FIG. 3. This layout means that the insert P10 is positioned substantially at the centre of the longitudinal rib P21.

Figure 7:
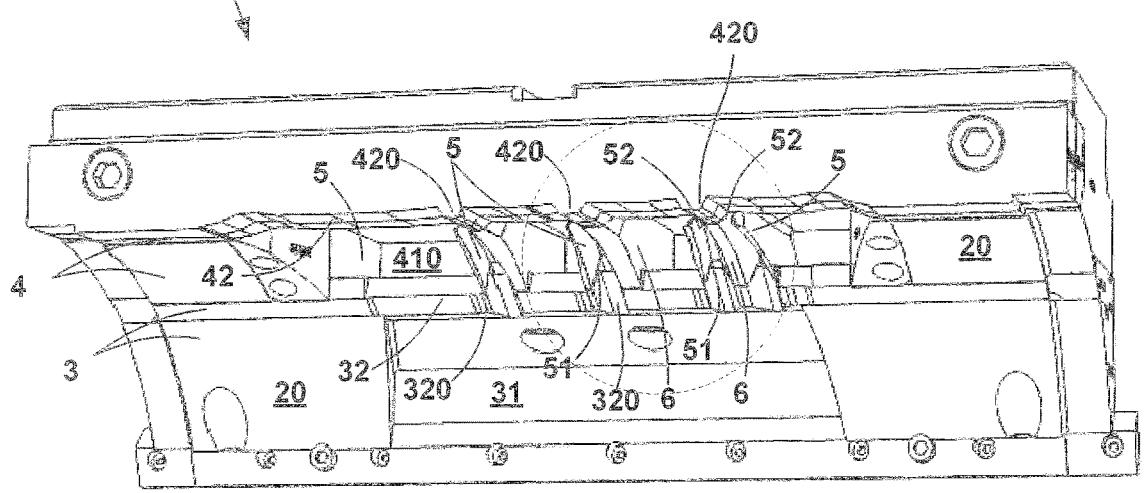
FIG. 7 is a schematic perspective view of the extrusion head according to the second embodiment of the disclosure.
Figure 8:
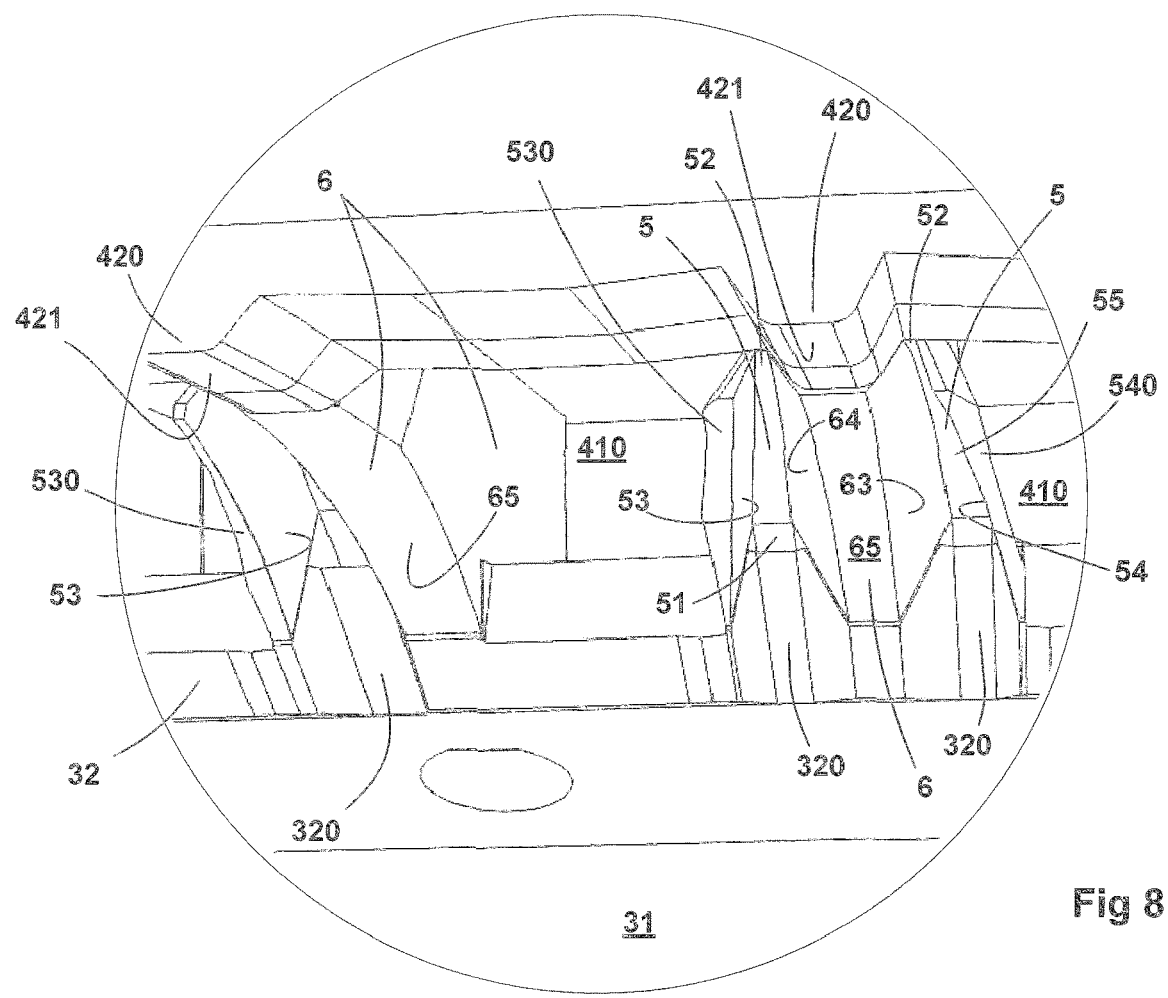
FIG. 8 is a detail view of that part of the extrusion head that is ringed in FIG. 7.
Figure 12:
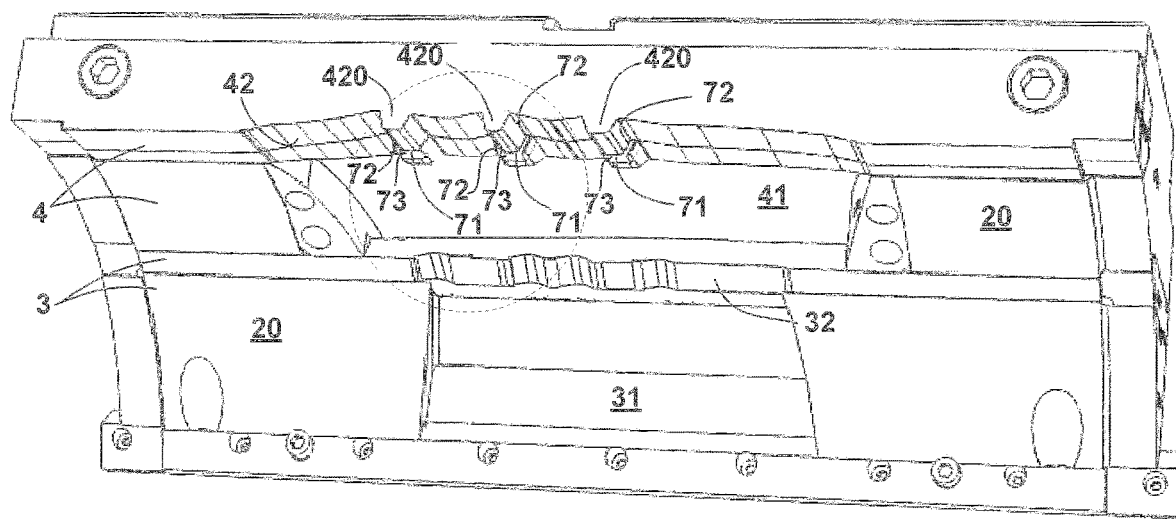
FIG. 12 is a schematic perspective view of an extrusion head according to the aforementioned third embodiment.
Figure 13:
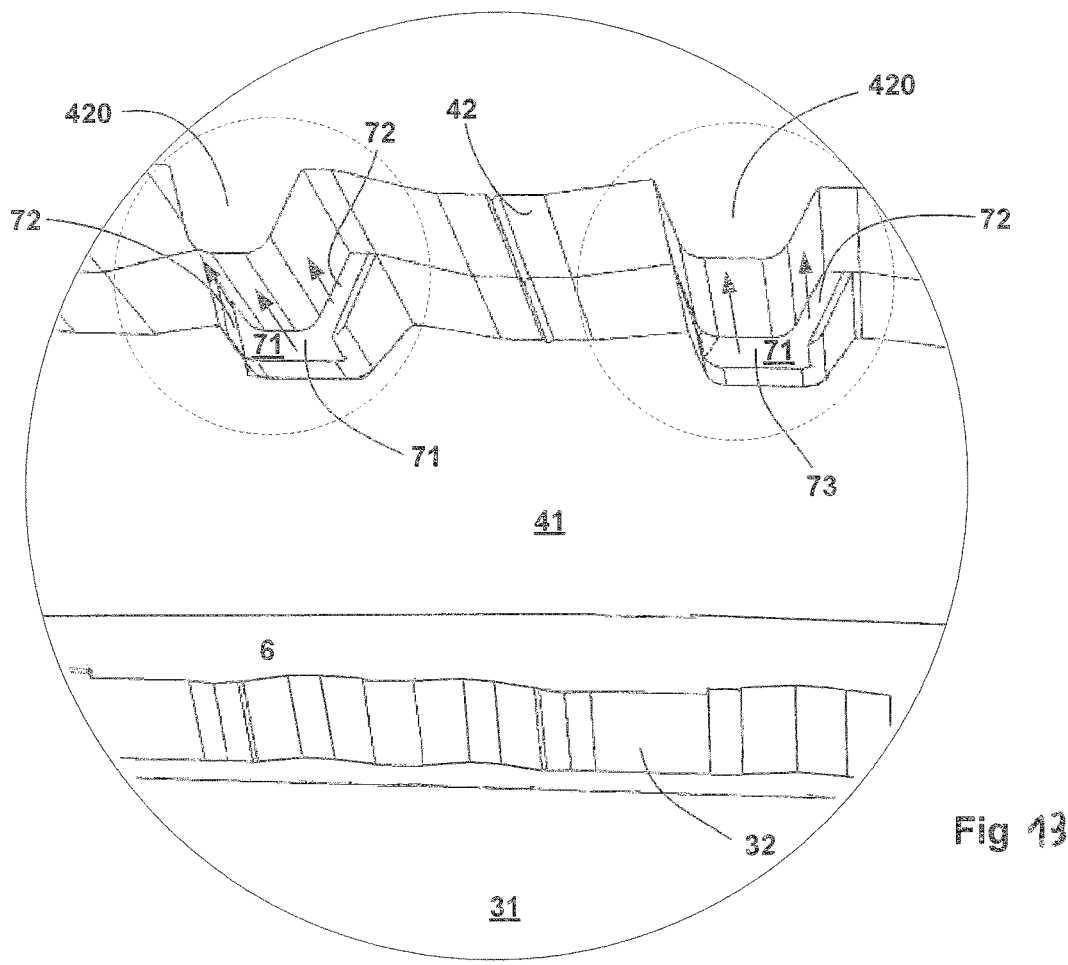
FIG. 13 is a detail view of that part of the extrusion head that is ringed in FIG. 12.

FIGS. 7 and 8 illustrates a second embodiment of the disclosure that makes it possible to produce a complex profiled element of the kind depicted in FIG. 4, and in which there is a desire to position the inserts P10 at a boundary between the longitudinal rib P21 and the tread-groove P20.

The profiling head then comprises at least one divider element 6 between the upstream profiling blade and the downstream profiling laid 42, positioned in the longitudinal continuation of a projection 420 of the downstream profiling blade 42 and extending from the upstream profiling blade 32 as far as the downstream profiling blade 42. This divider element 6 divides the said second extrusion canal 41 into sub-canals 410.

The lateral wall of one or several channels 5 then coincides with the lateral wall 63, 64 of a divider element 6 and the respective layouts of the walls forming the channel 5 with respect to the first 32 and to the second 42 profiling blade, and described hereinabove for the first embodiment of the disclosure, apply mutatis mutandis.

At the projection 420 of the downstream profiling blade 42, the radially internal wall 421 of the projection is positioned at the same radial position as the radially internal wall 65 of the divider element 6. This wall 65 extends downstream of the said projection 420 and, where it meets the upstream profiling blade 32, occupies the same radial position as the wall of the upstream profiling blade 32.

This means that the various forms of embodiment of the disclosure can be combined in numerous ways without thereby departing from the spirit of the disclosure.

Likewise, it will be considered that a machine for the coextrusion of a profiled element made up of the assembly of profiled elements formed from distinct rubber compounds, comprising a cylindrical roller and an extrusion head according to the disclosure, falls within the scope of protection of the present application.

In order to reproduce the complex profiled element PC1 as illustrated in FIG. 3, the second compound M2 is brought together with each of the lateral walls P11 and P12 of at least one insert P10.

And, in order to reproduce a complex profiled element PC2 as illustrated in FIG. 4, the second compound M2 is brought together with just one single lateral wall P11 or P12 of at least one insert.

In order to achieve better shaping of the insert, the walls are positioned in such a way that the cross section formed by the said walls and the base P13 of the insert on a radical plane passing through the axis 12 decreases between the exit of the first gap and the entrance to the second gap.

In order to obtain an insert P10 that is triangular in shape, the walls 53, 54, 55 are positioned in such a way that, at the entrance to the downstream gap, the cross section formed by the said walls and the base P13 of the insert on a plane perpendicular to the longitudinal direction is triangular in shape.

Likewise, the walls 53, 54, 55 of the channel 5 are positioned in such a way that the cross section formed by the said walls and the base P13 of the insert P10 on a plane perpendicular to the longitudinal direction decreases between the exit of the upstream gap and the entrance to the downstream gap.

The profiling wall may be fixed.

Alternatively, the lower wall of the extrusion head may have a concave shape with a cylindrical profile the given axis of which extends transversely and a circumferential direction of which coincides with the longitudinal direction DL defining the direction of progress of the profiled element through the machine. The profiling wall may then be formed by a cylindrical roller 10, capable of rotating about an axis 12 coinciding with the axis of the lower wall 20, a radially external wall 11 of which forms the said profiling wall.

It will be seen here that the first profiled element P1 has no discontinuity in the transverse direction DT.

Furthermore, for preference, the overall width of the first profiled element P1, and more particularly the overall width of the sublayer P14 thereof formed as a single piece, the said overall width being considered in the said transverse direction DT, represents more than half, and more preferably at least 70%, of the overall width of the complex profiled element PC, PC1, PC2 obtained at the exit of the downstream gap.

The sublayer P14, which is formed of a material, in this instance the first compound M1, that is stiffer than the material of which the second profiled element P2 is formed and therefore of which the tread is formed, namely the second compound M2, in effect preferably needs to occupy sufficient width to make an effective contribution to the adequate mechanical integrity of the tire, in combination with an underlying reinforcing ply with which the said sublayer P14 forms something like a composite beam within the radial thickness of the tire.

Furthermore, as indicated above, the inserts P10 are formed using the first material M1 and are in continuity of material with the rest of the profiled element P1 and, more particularly, with the sublayer formed as one piece over the aforementioned width.

Whatever the rest of its embodiment, the complex profiled element PC, PC1, PC2 according to the disclosure may beneficially be used to cover the crown of a green tire with a view to forming, after moulding and vulcanizing, the tread of that tire.

Another aspect of the disclosure, namely the use of outlet openings 71, 72 to generate edging rubber in the tread-grooves P20 will now be described. This aspect of the disclosure may effectively advantageously complement the generation and positioning of the inserts P10 as obtained using the channels 5 described in the foregoing.

This aspect of the disclosure will be described more particularly with reference to FIGS. 9 to 17, without that constituting any restriction on the disclosure.

Of course, for the convenience of the description, certain elements identical or analogous to those already described in the foregoing will be assigned the same references, and furthermore will not necessarily be the subject of another detailed description.

FIG. 10 depicts, according to a third alternative form of embodiment, a third complex profiled element PC3 comprising a first profiled element P1 made of a first compound M1 intended to form the sublayer and a second profiled element P2 made of a second compound M2 intended to form the tread. The profile of the tread comprises longitudinal grooves P20 interposed between longitudinal ribs P21.

This third complex profiled element PC3 also comprises at least one edging rubber P3 comprising an edging rubber P31 positioned in the bottom of the tread-groove and associated with at least one lateral edging rubber P30 covering a lateral wall of a tread-groove.

The edging rubber P3 is formed from a third compound M3.

The third compound M3 may be of the same kind as the compound M1 or, for preference, of a different kind.

As appropriate, the third compound M3 may be of the same kind as the second compound M2.

A fourth complex profiled element PC4 depicted in FIG. 11 comprises longitudinal inserts P10 made of the compound M1, of triangular overall shape, and which extend up in the radial direction DR from an imaginary base P13 situated on the radially external face of the sublayer P1, as far as the radially external surface of the second profiled element P2. These longitudinal inserts P10 are positioned along the edge of a longitudinal rib P21 at the boundary between the longitudinal rib P21 and the longitudinal tread-groove P20 so that a lateral wall P11 or P12 of the insert forms the edge of the tread-groove. The triangular shape of the insert P10 is nonlimiting and it is entirely possible, as will be seen later, to create inserts of different shapes provided that the base of the insert is in continuity of material with the radially external surface of the second profiled element that forms the sublayer.

It will be seen that only the opposite wall of the insert P10 to the wall that forms the edge of the tread-groove is then brought together with the second compound M2.

The edging rubber P3 is intended to cover the lateral walls of the insert P10 and the bottom of the tread-groove with a third compound M3.

This third compound M3 will be able to be formed of a composition of a different kind from the compositions that form the compounds M1 or M2 or, for preference here, of the same kind as the compound M2, but which can be also.

It goes without saying that the distinctive features of these two complex profiled elements PC3 and PC4 may be combined to form a complex profiled element comprising an edging rubber covering the walls of tread-grooves bordered by an insert and the walls of tread-grooves not comprising inserts.

An alternative form of extrusion head 2, corresponding to FIGS. 12 to 17 has been developed to make it possible to create complex profiled elements PC3, PC4 of the kind depicted in FIGS. 10 and 11.

As before, the extrusion head 2 comprises an upstream extruder 30 (visible in FIG. 9), in which the first compound M1 is worked, and which delivers into the lower wall 20 via an upstream extrusion canal 31 positioned upstream (in the sense of the longitudinal direction DL) of the upstream profiling blade 32.

This upstream profiling blade 32, the transverse profile of which is designed to shape the first profiled element P1 intended to form the sublayer P14, forms a gap with the radially external wall 11 of the roller 10. The first profiled element P1 may be of the kind depicted in FIG. 3 and extend continuously in the transverse direction DT.

A downstream extruder 40 (visible in FIG. 9), in which the compound M2 is worked, opens via a downstream extrusion canal 41 into the lower wall 20 downstream of the upstream profiling blade 32 and upstream of a downstream profiling blade 42.

The stream of compound M2 delivered from the downstream extrusion canal 41 therefore comes into contact with the radially external part of the first profiled element P1 forming the sublayer as soon as it leaves the downstream extrusion canal 41 and directly downstream of the upstream profiling blade 32 and well upstream of the downstream profiling blade 42. The meeting of these two streams may be a source of turbulence liable to alter the profile of the sublayer, and this is why the transverse profile of the upstream profiling blade 32 needs to be adapted accordingly.

As previously, the downstream gap defined between the downstream profiling blade 42 and the radially external surface 11 of the roller 10 serves to determine the transverse profile of the complex profiled element PC formed from the assembly of rubbers M1 and M2 and to perfect the bringing-together of the profiled elements P1 and P2.

Just as in the first and second alternative forms of embodiment described hereinabove with reference to FIGS. 5 to 8, the downstream profiling blade 42 preferably comprises at least one projection 420 intended to form a longitudinal tread-groove P20.

However, unlike in these previous alternative forms, the downstream extrusion unit 4 is associated with, in addition to the downstream extruder 40, an ancillary extruder 17, visible in FIG. 9, which supplies the third compound M3.

The ancillary extruder 70 is connected by an internal canal passing through the extrusion head 2 as far as the extrusion canal 71 opening into the upstream part of the projection 420 of the downstream profiling blade 42. This ancillary extrusion canal 71 is formed by two lateral walls 720 substantially parallel to the lateral walls 422 of the downstream part of the projection, and by an upstream wall 73 perpendicular to the longitudinal direction. These walls are borne by lateral partitions 721 and an upstream partition 731.

The cross section of the ancillary extrusion canal 71 on a radial plane of section perpendicular to the longitudinal direction DL, defines an imaginary surface inside which the entirety of the cross section, on this same plane, of the downstream part of the projection 420 can be inscribed. It will be noted that the downstream edge 723 of the lateral partitions 721 and the upstream face (not visible) of the projection 420 proper coincide with this plane of section.

At least one of the lateral walls 720 is distant by a value d from the lateral wall 422 of the downstream part of the projection 420 so as to define between these two walls a lateral outlet opening 72 of width d via which the compound M3 coming from the ancillary extruder 70 is extruded to form a lateral edging rubber P30.

The radially lower edge 722 of the lateral walls 720 and the radially lower edge 432 of the upstream wall 730 are inscribed in a plane substantially perpendicular to the radial direction DR. This plane is distant from the radially internal wall 421 of the projection 420 by a value e. Also, the opening in the said radial plane of section between the radially lower wall 421 and the radially lower edge of the walls 720 and 730 defines a lower outlet opening 73 of height e, via which the compound coming from the ancillary extruder 70 is extruded to form the edging rubber in the bottom of the tread-groove P31.

The lateral outlet openings 72 and the lower outlet opening 73 open into one another to ensure the continuity of material between the lateral edging rubbers P30 and the groove-bottom edging rubber P31.

Likewise, the radially lower space of the outlet opening or openings 72, 73 preferably remains open and faces the stream of material coming from upstream and entering the gap defined by the downstream profiling blade 42 and the radially external surface 11 of the roller 10.

The values of the distances d and e define the thicknesses of the respectively lateral P30 and lower P31 edging rubbers. As a general rule, these values are of the order of a millimetre and preferably below this value.

The preferred directions of flow of the material M3 leaving the extrusion canal 71 is embodied by bold arrows.

Figure 14:
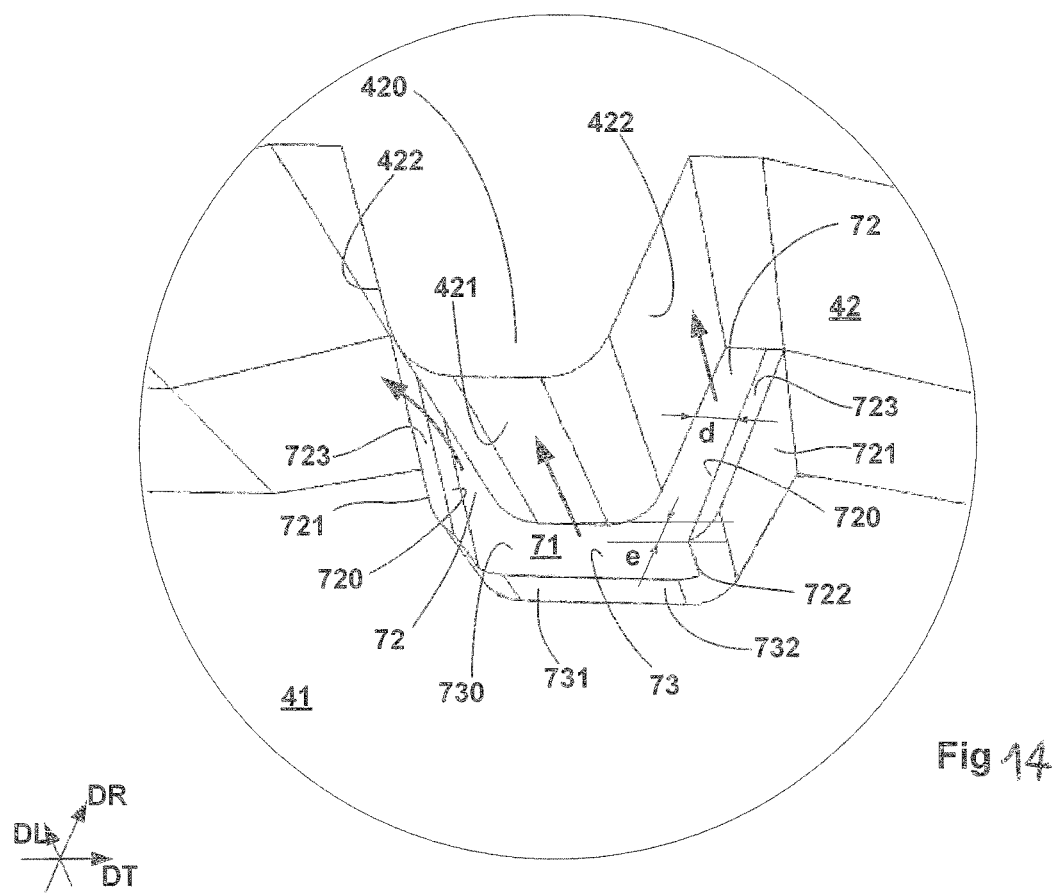
FIGS. 14 and 15 are detail views of the extrusion head ringed in FIG. 13 showing the outlet openings of the ancillary extrusion canal.
Figure 15:
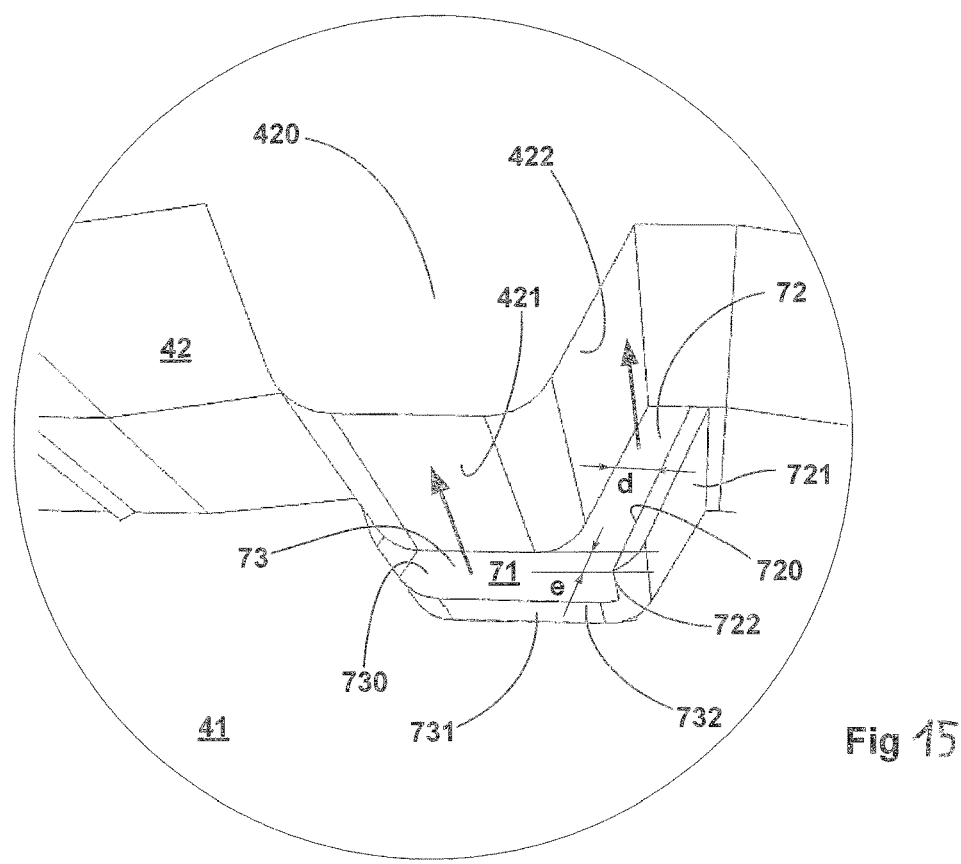

The choice between one or two lateral openings depends on the configuration of the complex profiled element PC, PC3, PC4 that is desired be produced, particularly whether there is a desire to cover just one or both lateral faces of the tread-groove with edging rubber P3 (see FIG. 10 or 11). Thus, FIG. 14 depicts an ancillary extrusion canal 71 comprising two lateral openings 72; and FIG. 15 depicts an ancillary extrusion canal 71 comprising just one lateral opening 72.

Extruding the edging rubber P3 in the downstream profiling blade just upstream of the projection 420 makes it possible to avoid the profile of this rubber being disrupted by the effects of the circulation of the streams of compound M1 and M2 entering the downstream gap defined by this downstream profiling blade 42. Because the ancillary extrusion canal is positioned a few millimetres away from the outlet for the complex profiled element, the pressure in the material is close to zero and the movements of rubber liable to alter the profile of the edging rubber are negligible.

A fourth embodiment of the disclosure is particularly well suited to producing complex profiled elements PC4 of a fourth type corresponding to that depicted in FIG. 11, which corresponds to inserts P10 positioned at the boundary of one or both lateral edges of a tread-groove P20.

An extrusion head 2 according to this embodiment of the disclosure is illustrated in FIGS. 16 and 17. It differs from the extrusion head used for producing the third complex profiled element PC3 described hereinabove in that it comprises at least one divider element 6 positioned in the longitudinal continuation of the projections 420 of the downstream profiling blade 42. This divider element 6 extends from the upstream profiling blade 32 as far as the downstream profiling blade 42 and divides the said downstream extrusion canal 41 into sub-canals 410.

At the downstream profiling blade 42, the lateral walls 63 of the divider element 6 are positioned in the continuation of the lateral partitions 721 of the ancillary extrusion canal 71, and the radially internal wall 64 of the divider element 6 is positioned radially substantially at the same level as the radially lower edge 732 of the partition 731 supporting the upstream wall 730 of the ancillary extrusion canal 71 outlet. Thus, the upstream partition 731 supporting the said upstream wall 730 may beneficially coincide with the downstream end of the divider element 6.

Where it meets the upstream profiling blade 32, the radially internal wall 64 of the divider element is positioned radially at the same level as the wall of the upstream profiling blade 32.

For preference, the extrusion head 2 also comprises at least one channel 5 extending in the longitudinal direction, from the upstream profiling blade 32 as far as the downstream profiling blade 42.

Such a channel 5 preferably exhibits the feature or features already described with reference to FIGS. 1 to 8 for the same purposes of protecting the insert P10 against the second compound M2.

Such a channel 5 preferably here takes the form of a canal of substantially triangular or trapezoidal cross section comprising a lateral wall 53 supported by a partition 530, another lateral wall positioned facing the previous one, and formed by a lateral wall 63 of a divider element 6, and a wall 54 that forms the bottom of the channel. The walls 53, 63 and 54 together form a continuous concave surface open radially towards the inside and the concavity of which faces the radially external wall 11 of the roller 10. These walls define a duct, in the image of a gutter or of an inverted hull open at its two, upstream 51 and downstream 52, ends.

At the upstream end 51 of the channel 5, the partition 530 is attached to the downstream flank 321 of the downstream profiling blade 32, and the radially lower edge of the partition 530 lies flush with the profile of the upstream extrusion blade 32. The upstream profiling blade 32 thus has, at this upstream end 51 of the channel 5, a transverse profile in the form of an outfall 320, the downstream part of which is positioned in continuity with the wall 55 that forms the bottom of the channel, so as to encourage flow of the compound M1 in the channel 5.

At the downstream end 52 of the channel 5, the channel 5 opens directly into the gap formed by the downstream profiling blade 42 and the radially external wall 11 of the roller 10. The channel 5, illustrated in FIGS. 16 and 17 is configured in such a way that the wall 55 that forms the bottom of the channel 5 is positioned radially at the same level as the radial position at this level of the downstream profiling blade 42. By contrast, at this downstream end 52, the partition 530 supporting the lateral wall 53 of the channel extends radially towards the inside at a radial position lower than the position of the downstream profiling blade 42.

If it is not necessary to have the insert emerge onto the surface of the tread, it is entirely possible, at the downstream end 52 of the channel 5, to position the wall 55 that forms the bottom of the channel 5 at a radially lower position than that of the radial position of the downstream profiling blade 42.

Thus, while remaining in continuity of material with the compound M1 that forms the sublayer, the proportion of compound M1 entering the channel 5 flows directly from the upstream end 51 to the downstream end 52 without being brought into contact with the compound M2, so that the changes in pressure observed where the stream of compound M2 combines with the stream of compound M1 do not lead to any disruption of the profile conferred upon the compound M1 that has entered the channel 5 and is intended to form the insert P10.

The shaping of the insert P10 occurs throughout the entire progression of the first compound M1 along the channel 5, and the profile according to a radial plane passing through the downstream end of the channel 5 corresponds to the profile of the insert P10 of the complex profiled element PC. The bringing-together of the opposite wall (P11 or P12) of the insert to that wall of the insert that forms the wall of the tread-groove, with the compound M2 that forms the tread, therefore takes place directly in the gap formed by the downstream profiling blade 42 and the radially external wall 11 of the roller, without the profile of the insert being modified.

The way in which the pressure in the channel 5 evolves can be controlled by adjusting the angle formed by the lateral walls 53 and 63 with respect to the longitudinal direction DL. These two walls converge towards one another in the direction from upstream towards downstream, making for example an angle of the order of 5° with the longitudinal direction, so that the transverse cross section of the channel on a radial plane or on a plane perpendicular to the longitudinal direction decreases continuously in the direction from the upstream end 51 towards the downstream end 52 of the channel, and so that the said cross section is at a minimum at the downstream end 52.

The partition 530 of the channel supporting the lateral wall 53 is small in thickness in order not to disrupt the streams of material flowing over its two faces. A thickness less than 2 mm, and preferably less than 1 mm, appears to be suitable.

In the scenario illustrated in FIGS. 16 and 17, the cross section of the channel at the downstream end 52 has a substantially triangular shape corresponding to a preferred embodiment of the insert. However, the shape of this cross section is nonlimiting and can be adapted at will.

Extruding the compound M3 via the outlet openings 72 and 73 allows the edging rubber P3 to be applied to the flank of the insert and to the bottom of the tread-groove.

It may be seen here that the downstream end 52 of the channel 5 is positioned slightly upstream of the lateral openings 72 so that the lateral edge P11 of the insert P10 is formed before it receives the edging rubber P3.

Thus, more generally, an extrusion head 2 according to the disclosure, which comprises one or more channel(s) 5 as described above, may preferably be characterized in that the downstream profiling blade 42 comprises at least one projection 420 to form a longitudinal tread-groove P20 in the complex profiled element PC, in that the channel 5 is arranged in such a way as to position the insert P10 at the boundary of a lateral edge of the said tread-groove P20 so that a lateral wall P11, P12 of the said insert P10 forms the edge of the said tread-groove, and in that the ancillary extrusion canal 71 comprises outlet openings 72, 73 positioned at the edge of the said projection 420, upstream of the said projection 420, and forming one or more lateral outlet openings 72 and a lower outlet opening 73, so that an edging rubber P3 which contains a groove-bottom edging rubber P31 applied on the bottom of the tread-groove by the lower outlet opening 73 and at least one lateral edging rubber P30 applied on the lateral wall P11, P12 of the insert P10 by a lateral outlet opening 72 can be applied to the tread-groove P20 of the complex profiled element PC1, PC2.

Advantageously, the use of the outlet openings 72, 73, in combination with the channel or channels 5 allows the precise covering of the lateral wall of the insert P10 and, more generally, the walls of the tread-groove P20, with an even and thin edging layer of properly controlled extra thickness, which may preferably be of the same composition as the second compound M2.

Of course, the disclosure relates to a corresponding method, and to the alternative forms thereof.

Thus the disclosure relates to a method for the coextrusion of a complex profiled element PC, PC1, PC2, PC4 made up of the assembly of profiled elements P1, P2 formed from distinct rubber compounds M1, M2, in which, using a coextrusion machine 1 comprising an upstream extruder 30 and a downstream extruder 40 delivering into an extrusion cavity formed by the space comprised between a lower wall 20 of an extrusion head 2 and a profiling wall 11 positioned opposite the lower wall 20, steps are implemented during which:

using the upstream extruder 30, a first rubber compound M1 which emerges from an upstream extrusion canal 31 in the lower wall 20 of the extrusion head 2 is delivered upstream of a first profiling blade 32 referred to as the "upstream profiling blade" 32, a first profiled element P1, formed of the first rubber compound M1, is created in an upstream gap which is defined by the upstream profiling blade 32 and the profiling wall 11, the said first profiled element P1 comprising at least a first profiled-element portion which is intended to form a sublayer P14 and at least a second profiled-element portion which is intended to form a longitudinal insert P10, a base P13 of which is in continuity of material with the said sublayer P14, and which on the said sublayer P14 forms a protrusion lateral walls P11, P12 of which extend outwards with respect to an external surface of the said first profiled element P1, using the downstream extruder 40, a second rubber compound M2 is delivered via a downstream extrusion canal 41 which opens into the lower wall 20 of the extrusion head 2 downstream of the upstream profiling blade 32, and the second rubber compound M2 is brought together with the radially external surface of the first profiled element P1 at the region where the stream of second rubber compound M2 meets the stream of first rubber compound M1, the first profiled element P1 and the second rubber compound M2 are passed through a downstream gap which is positioned downstream of the downstream extrusion canal 40 and which is defined by a second profiling blade 42, referred to as the "downstream profiling blade" 42, and the profiling wall 11, so as to create a complex profiled element PC formed of the first M1 and of the second M2 rubber compounds.

In this method, according to the disclosure, a portion of the first rubber compound M1, intended to form the insert P10, is circulated between walls 53, 54, 55 of a channel 5 which extend in a longitudinal direction DL between the upstream profiling blade 32 and the downstream profiling blade 42, from an upstream end 51 of the channel 5 which is situated upstream of the meeting of the streams of the first and second rubber compounds M1, M2, as far as a downstream end 52 of the said channel 5 which is situated downstream of the said meeting of the streams and upstream of the downstream profiling blade 42, the said walls 53, 54, 55 of the channel together forming a concave surface open towards the inside of the extrusion cavity and being positioned in such a way that the portion of the first rubber compound M1 that enters the channel 5 and that is intended to form the insert P10, as it progresses longitudinally along the channel 5, remains in continuity of material with the sublayer P14 without being brought into contact with the second rubber compound M2, and so that the bringing-together of one or more lateral walls P11, P12 of the said insert P10 with the second rubber compound M2 then takes place in the downstream gap defined by the downstream profiling blade 42 and the profiling wall 11.

Furthermore, the downstream profiling blade 42 preferably comprises at least one projection 420 to form a longitudinal tread-groove P20 in the complex profiled element PC, and the insert P10 is placed at the boundary of a lateral edge of the said tread-groove P20 so that a lateral wall P11, P12 of the said insert P10 forms the edge of the said tread-groove, and in which, using an ancillary extruder 70, a third rubber compound M3 is delivered via an ancillary extrusion canal 71 which opens into an upstream part of the projection 420, the said ancillary extrusion canal 71 comprising outlet openings 72, 73 positioned at the edge of the said projection 420 and forming one or more lateral outlet openings 72 and a lower outlet opening 73, so that an edging rubber P3 which comprises a groove-bottom edging rubber P31 applied to the bottom of the tread-groove by the lower outlet opening 73 and at least one lateral edging rubber P30 applied to the lateral wall P11, P12 of the insert P10 by a lateral outlet opening 72 can be applied in the tread-groove P20 of the complex profiled element PC, PC1, PC2, PC4.

For preference, the downstream end 52 of the channel 5 is positioned upstream of the lateral outlet openings 73 so that the lateral wall P11, P12 of the insert P10 is formed before it receives the edging rubber P3.

For preference, as illustrated in FIG. 11, a third rubber compound M3, which has the same composition as the second rubber compound M2, is used to form the edging rubber P3.

Advantageously, it is thus possible to obtain a complex profiled element PC, PC4, in which the insert P10 has being somewhat "offset" laterally (in the transverse direction DT) inside the second compound M2 of which the corresponding block of the tread is made, namely, definitively, inside a block of the tread, while at the same time, thanks to the fineness of the thickness of the lateral edging rubber P30 that the lateral outlet opening 72 makes it possible to obtain, keeping the said insert P10 close to the tread-groove P20 in a position in which the said insert P10 does effectively reinforce the block made of the second compound.

By way of indication, the thickness of the lateral edging rubber P30 that covers the lateral wall P11, P12 of the insert P10 may be of the order of 2 mm.

Definitively, according to whether the choice is made to cover a lateral wall P11, P12 of an insert P10 either with a thin layer of edging rubber P31 made of second compound M2 delivered by the ancillary extruder and 70 the outlets 72, or with a thick (considered in the transverse direction) layer of second compound M2 delivered by the downstream extruder 40, the insert P10 can be positioned laterally as desired in a block of the tread, in so far as the depth (considered in the transverse direction DT) to which the said insert P10 is inset into the said block will be freely defined by the dimensions of the openings 72 and of the downstream profiling blade 42.

By way of indication, the depth to which the insert P10 is laterally set into the block made of second compound M2 may be comprised between a minimum depth of 2 mm (a fine thickness that can be achieved using the openings 72) and a maximum depth of 12 mm, typically equivalent to half the overall lateral dimension (generally of the order of 25 mm) of a tread block.

Of course, the disclosure is not in any way restricted solely to the exemplary embodiments described in the foregoing, a person skilled in the art being notably capable of isolating or combining with one another one or another of the aforementioned features, or of substituting an equivalent therefor.

Terminology

1 Coextrusion machine
10 Roller
11 Radially external wall of the roller
12 Axis of rotation of the roller
13 Discharge belt
2 Extrusion head
20 Lower wall
3 Upstream extrusion unit
30 Upstream extruder
31 Upstream extrusion canal
32 Upstream profiling blade
320 Outfall
321 Downstream flank of the upstream profiling blade
4 Downstream extrusion unit
40 Downstream extruder
41 Downstream extrusion canal
410 Sub-canal
42 Downstream profiling blade
420 Projection
421 Radially lower wall of the projection
422 Lateral wall of the projection
5 Channel
51 Upstream end of the channel
52 Downstream end of the channel
53 First lateral wall of the channel
530 First partition
54 Second lateral wall of the channel
540 Second partition 55 Wall forming the bottom of the channel,
6 Divider element
63 First lateral wall of the divider element
64 Second lateral wall of the divider element
65 Radially internal wall of the divider element
70 Ancillary extruder
71 Ancillary extrusion canal
72 Lateral outlet opening 1
720 Lateral wall of the ancillary outlet canal 71
721 Lateral partition of the outlet canal supporting the lateral wall 720
722 Radially lower edge of the lateral wall 720
723 Downstream edge of the lateral wall 720
73 Lower outlet opening
730 Upstream wall of the ancillary outlet canal 71
731 Upstream partition supporting the upstream wall 730
732 Radially lower edge of the upstream wall 730
R Direction of rotation of the roller
DT Transverse direction
DL Longitudinal direction; direction of progression
PC, PC0, PC1, PC2, PC3, PC4 Complex profiled element
P1 First profiled element (forming a sublayer)
P10 Longitudinal insert (second element making up the first profiled element P1)
P11 First lateral wall of the insert
P12 Second lateral wall of the insert
P13 Base of the insert
P14 Sublayer (first element making up the first profiled element P1)
P2 Second profiled element (tread)
P20 Longitudinal tread-groove
P21 Longitudinal rib
P3 Edging rubbers P30 and P31
P30 Lateral edging rubber
P31 Groove-bottom edging rubber
M1 First rubber compound
M2 Second rubber compound
M3 Third rubber compound forming the edging rubbers

What is claimed is:

1. A coextrusion method for the coextrusion of a complex profiled element made up of an assembly of profiled elements formed from distinct rubber compounds, in which, using a coextrusion machine comprising an upstream extruder and a downstream extruder delivering into an extrusion cavity formed by the space comprised between a lower wail of an extrusion head and a profiling wall positioned opposite the lower wall, steps are implemented during which:

using the upstream extruder, a first rubber compound which emerges from an upstream extrusion canal in the lower wall of the extrusion head is delivered upstream of a first profiling blade referred to as the "upstream profiling blade", a first profiled element, formed of the first rubber compound, is created in an upstream gap which is defined by the upstream profiling blade and the profiling wall, the first profiled element comprising at least a first profiled-element portion which is intended to form a sublayer and at least a second profiled-element portion which is intended to form a longitudinal insert, a base of which is in continuity of material with the sublayer, and which on the sublayer forms protrusion lateral walls which extend outwards with respect to an external surface of the first profiled element, using the downstream extruder, a second rubber compound is delivered via a downstream extrusion canal which opens into the lower wall of the extrusion head downstream of the upstream profiling blade, and the second rubber compound is brought together with a radially external surface of the first profiled element at the region where the stream of second rubber compound meets the stream of first rubber compound, the first profiled element and the second rubber compound are passed through a downstream gap which is positioned downstream of the downstream extrusion canal and which is defined by a second profiling blade, referred to as the "downstream profiling blade", and the profiling wall, so as to create a complex profiled element formed of the first and of the second rubber compounds, wherein a portion of the first rubber compound, intended to form the insert, is circulated between walls of a channel which extend in a longitudinal direction between the upstream profiling blade and the downstream profiling blade, from an upstream end of the channel which is situated upstream of the meeting of the streams of the first and second rubber compounds, as far as a downstream end of the channel which is situated downstream of the meeting of the streams and upstream of the downstream profiling blade, the walls of the channel together forming a concave surface open towards the inside of the extrusion cavity and being positioned in such a way that the portion of the first rubber compound that enters the channel and that is intended to form the insert, as it progresses longitudinally along the channel, remains in continuity of material with the sublayer without being brought into contact with the second rubber compound, and so that the bringing-together of one or more lateral walls of the insert with the second rubber compound then takes place in the downstream gap defined by the downstream profiling blade and the profiling wall.

2. The coextrusion method according to claim 1, in which the walls of the channel extend from the upstreamgap as far as the downstream gap.

3. The coextrusion method according to claim 1, in which the downstream profiling blade comprises at least one projection to form a longitudinal tread-groove in the complex profiled element, in which method the insert is placed at the boundary of a lateral edge of the tread-groove so that a lateral wall of the insert forms the edge of the tread-groove, and in which, using an ancillary extruder, a third rubber compound is delivered via an ancillary extrusion canal which opens into an upstream part of the projection, the ancillary extrusion canal comprising outlet openings positioned at the edge of projection and forming one or more lateral outlet openings and a lower outlet opening, so that an edging rubber which comprises a groove-bottom edging rubber applied on the bottomof the tread-groove by the lower outlet opening and at least one lateral edging rubber deposited on the lateral wall of the insert by a lateral outlet opening can be deposited in the tread-groove of the complex profiled element.

4. The coextrusion method according to claim 3, in which the downstream end of the channel is positioned upstream of the lateral outlet openings so that the lateral wall of the insert is formed before it receives the edging rubber.

5. The coextrusion method according to claim 3, in which a third rubber compound, which has the same composition as the second rubber compound, is used to form the edging rubber.

6. The coextrusion method according to claim 1, in which, as it progresses along the channel, the cross section of the insert on a plane perpendicular to the longitudinal direction decreases between the exit from the upstream gap and the entry to the downstream gap.

7. The coextrusion method according to claim 1, in which, at the entry to the downstream gap, the cross section of the insert on a plane perpendicular to the longitudinal direction is triangular in shape.

8. The coextrusion method according to claim 1, in which, at the exit from the downstream gap, an external vertex of the insert lies flush with the external surface of the complex profiled element.

9. The coextrusion method according to claim 1, in which the second compound is brought together with each of the lateral walls of at least one insert.

10. The coextrusion method according to claim 1, in which the second compound is brought together with just one of the lateral walls of at least one insert.

11. The coextrusion method according to claim 1, in which there is extruded a first profiled element that has no discontinuity in a transverse direction perpendicular to the longitudinal direction, and of which, the overall width considered in the transverse direction, represents more than half of the overall width of the complex profiled element obtained.

12. The coextrusion method according to claim 11, wherein the overall width considered in the transverse direction, represents at least 70% of the overall width of the complex profiled element obtained.

13. The coextrusion method according to claim 1, in which
the lower wall of the extrusion head has a concave shape with a cylindrical profile the given axis of which extends transversely, and a circumferential direction of which coincides with the longitudinal direction defining the direction of progress of the profiled element through the machine, and
the profiling wail is formed by a cylindrical roller, capable of rotating about an axis coinciding with the axis of the lower wall, a radially external wall of which forms the profiling wall.

14. An extrusion head for extruding a complex profiled element made up of an assembly of profiled elements formed from distinct rubber compounds, intended to be mounted on a coextrusion machine, and through which the profiled elements progress in an extrusion cavity in a direction of extrusion extending from upstream to downstream, defining a longitudinal direction, the extrusion head comprising a lower wall partially delimiting the extrusion cavity and, from upstream towards downstream of the lower wall in the longitudinal direction:
an upstream extrusion unit comprising an upstream extrusion canal which is positioned at the outlet of an upstream extruder and which opens into the lower wall so as to be able to deliver a stream of a first rubber compound,
an upstream profiling blade, positioned transversely downstream of the upstream extrusion canal to determine a first transverse profile of a first profiled element formed from the stream of first rubber compound,
a downstream extrusion unit comprising a downstream extrusion canal which is positioned at the outlet of a downstream extruder and which opens into the lower wall downstream of the upstream profiling blade so as to be able to deliver a stream of a second rubber compound and bring the stream of second compound together with the stream of first rubber compound in a stream meeting region,
a downstream profiling blade which is positioned transversely downstream of the downstream extrusion canal and of the stream meeting region, to determine a transverse profile of the complex profiled element formed from the first and second rubber compounds,
wherein the extrusion head comprises at least one channel, formed by walls which extend in the longitudinal direction between the upstream profiling blade and the downstream profiling blade, from an upstream end of the channel which is situated upstream of the region in which the streams of the first and second rubber compounds meet, as far as a downstream end of the channel which is situated downstream of the region in which the streams meet and upstream of the downstream profiling blade, the walls of the channel together forming a concave surface open towards the inside of the extrusion cavity and being positioned in such a way that, on the one hand, a portion of the stream of the first rubber compound intended to form an insert in the complex profiled element can enter the channel and progress longitudinally in the channel without being brought into contact with the second rubber compound but remaining in continuity of material with a sublayer of the first profiled element made of the first rubber compound, which will have been formed in an upstream gap defined by the upstream profiling blade, and that, on the other hand, a bringing-together of one or more lateral walls of the insert with the second rubber compound then takes place in a downstream gap defined by the downstream profiling blade.

15. The extrusion head according to claim 14, wherein the downstream profiling blade comprises at least one projection to form a longitudinal tread-groove in the complex profiled element, in that wherein the channel is arranged in such a way as to position the insert at the boundary of a lateral edge of the tread-groove so that a lateral wall of the insert forms the edge of the tread-groove, and in that an ancillary extrusion canal comprises outlet openings positioned at the edge of the projection, upstream of the projection, and forming one or more lateral outlet openings and a lower outlet opening, so that an edging rubber which contains a groove-bottom edging rubber applied on the bottom of the tread-groove by the lower outlet opening and at least one lateral edging rubber applied on the lateral wall of the insert by a lateral outlet opening can be applied to the tread-groove of the complex profiled element.

* * * * *